(12) United States Patent
Yoshitake et al.

(10) Patent No.: US 7,410,720 B2
(45) Date of Patent: Aug. 12, 2008

(54) FUEL CELL AND METHOD FOR MANUFACTURING THE SAME

(75) Inventors: Tsutomu Yoshitake, Tokyo (JP); Hidekazu Kimura, Tokyo (JP); Takashi Manako, Tokyo (JP); Ryota Yuge, Tokyo (JP); Yoshimi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/205,717

(22) Filed: Aug. 17, 2005

(65) Prior Publication Data

US 2005/0277007 A1 Dec. 15, 2005

Related U.S. Application Data

(63) Continuation of application No. PCT/JP2004/001715, filed on Feb. 17, 2004.

(30) Foreign Application Priority Data

Feb. 18, 2003 (JP) ............................. 2003-040082

(51) Int. Cl.
*H01M 8/10* (2006.01)
*H01M 4/86* (2006.01)
*H01M 4/88* (2006.01)
*H01M 8/24* (2006.01)

(52) U.S. Cl. ..................... 429/44; 429/32; 429/40; 429/41

(58) Field of Classification Search .................. 429/32
See application file for complete search history.

(56) References Cited

U.S. PATENT DOCUMENTS

| 4,648,955 A | 3/1987 | Maget |
| 5,547,911 A | 8/1996 | Grot |
| 5,863,672 A | 1/1999 | Ledjeff et al. |
| 5,989,741 A * | 11/1999 | Bloomfield et al. ........... 429/32 |
| 6,080,504 A * | 6/2000 | Taylor et al. .................. 429/42 |
| 6,103,077 A | 8/2000 | DeMarinis et al. |
| 6,136,463 A * | 10/2000 | Kindler et al. ................ 429/40 |
| 6,183,898 B1 * | 2/2001 | Koschany et al. ............. 429/42 |
| 6,680,139 B2 * | 1/2004 | Narayanan et al. ............ 429/34 |
| 2003/0124413 A1 * | 7/2003 | Bai et al. ....................... 429/44 |

(Continued)

FOREIGN PATENT DOCUMENTS

EP 0226911 * 5/1986

(Continued)

OTHER PUBLICATIONS

International Search Report dated Jun. 1, 2004 from corresponding International Application PCT/JP2004/001715.

*Primary Examiner*—Jonathan Crepeau
*Assistant Examiner*—Tony Chuo
(74) *Attorney, Agent, or Firm*—Katten Muchin Rosenman LLP

(57) ABSTRACT

An electrode sheet (489) is put in one side of a solid electrolyte membrane (114) at its cut portion. A base member (110) for an oxidant electrode side current collector electrode sheet (499) is placed at a location facing a base member (104) for the electrode sheet (489) formed on one face of the solid electrolyte membrane (114). In addition, the base member (104) for a fuel electrode side current collector electrode sheet (497) is placed at a location facing the base member (110) formed on the other face of the electrolyte film (114).

21 Claims, 11 Drawing Sheets

U.S. PATENT DOCUMENTS

2003/0224236 A1* 12/2003 Morita et al. ............ 429/34
2004/0241516 A1* 12/2004 Kimura et al. ............ 429/32

FOREIGN PATENT DOCUMENTS

| | | | |
|---|---|---|---|
| JP | 62-2466 | | 1/1987 |
| JP | 07-057742 | * | 3/1995 |
| JP | 10-507305 | | 7/1998 |
| JP | 10-510390 | | 10/1998 |
| JP | 11-273688 | | 10/1999 |
| JP | 2001-273914 | | 10/2001 |
| JP | 2001-283892 | | 10/2001 |
| JP | 2002-110215 | * | 4/2002 |
| JP | 2003-282078 | | 10/2003 |
| WO | WO 96/11507 | | 4/1996 |
| WO | WO 96/18216 | | 6/1996 |

* cited by examiner

FIG. 4
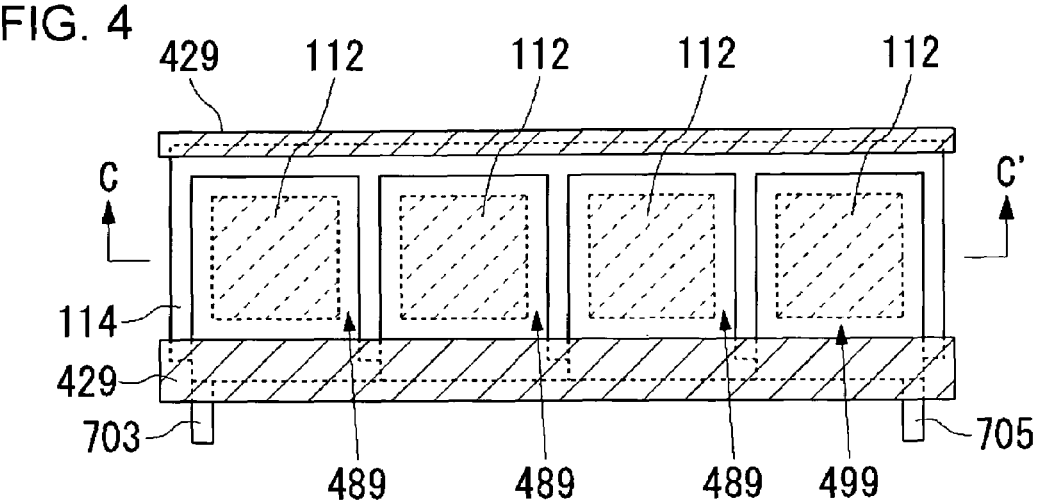
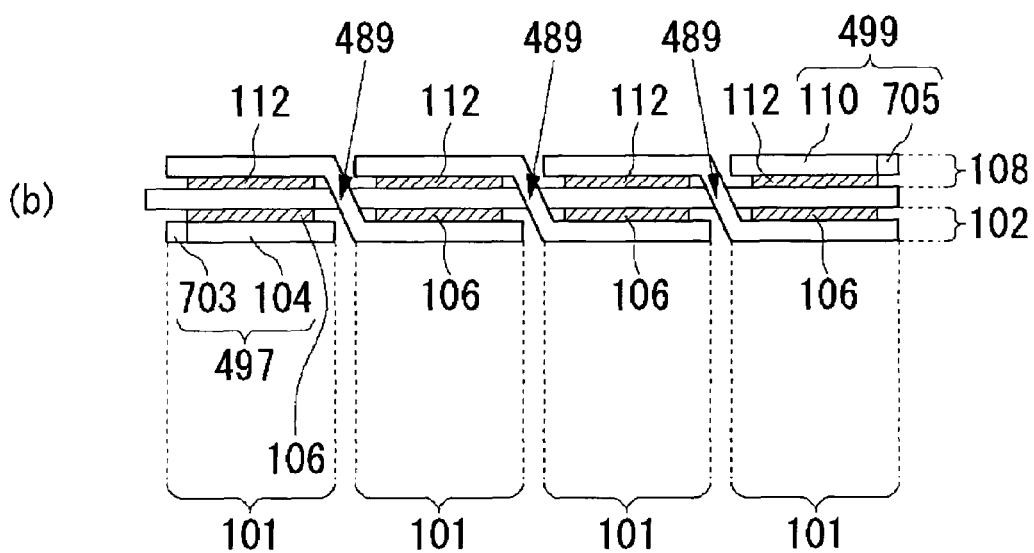

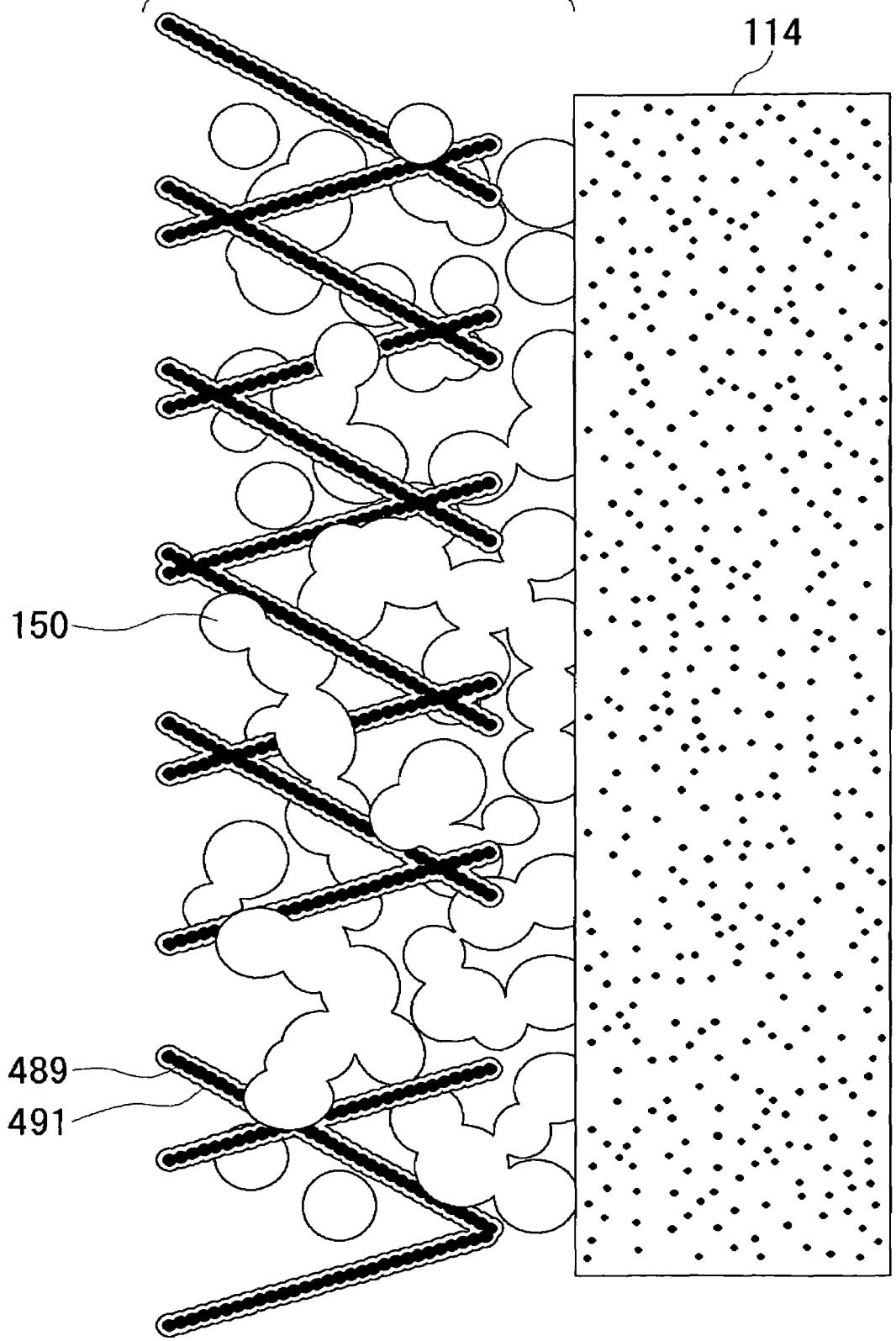

FUEL CELL AND METHOD FOR MANUFACTURING THE SAME

CROSS-REFERENCE TO RELATED APPLICATION

This application is a continuation of International Application PCT/JP2004/001715 filed on Feb. 17, 2004, now pending, and claims priority from Japanese Patent Application 2003-040082 filed on Feb. 18, 2003, the contents of which are herein wholly incorporated by reference.

FIELD OF THE INVENTION

The present invention relates to a fuel cell and a manufacturing method thereof.

DESCRIPTION OF THE RELATED ART

With the advent of the information-oriented society in recent years, the quantity of information treated by electronic devices such as personal computers and the like has been increased drastically, and the power consumption of the electronic devices has also been increased considerably, along with it. In particular, in portable electronic devices, there is concern about the increase in power consumption associated with expansion in processing capacity. Currently, lithium ion batteries are generally used as the power sources for these portable electronic devices, but the energy density of the lithium ion batteries is reaching the theoretical maximum. Thus, the lithium batteries had a restriction that it was necessary to keep the power consumption low by reducing the operating frequency of its CPU for elongating the uninterrupted service period of the portable electronic devices.

Under the circumstance, it is expected that it would become possible to elongate the uninterrupted service period of portable electronic devices drastically by using a fuel cell higher in energy density as the power source for the electronic devices in place of the lithium ion battery.

A fuel cell consists of a pair of fuel electrode and oxidant electrode (hereinafter, these are referred to as "catalytic electrodes") and an electrolyte placed between them, and a fuel is supplied to the fuel electrode, and an oxidant is supplied to the oxidant electrode, thereby producing electric power via a chemical reaction. Generally, hydrogen has been used as the fuel, but recently, methanol-conversion fuel cells that transform methanol into hydrogen and direct methanol fuel cells that directly utilize methanol as a fuel have been intensively studied by using methanol, which is cheap and easier-to-handle, as the fuel.

When hydrogen is used as the fuel, the reaction on the fuel electrode is represented by the following Formula (1):

$$3H_2 \rightarrow 6H^+ + 6e^- \quad (1)$$

When methanol is used as the fuel, the reaction on the fuel electrode is represented by the following Formula (2):

$$CH_3OH + H_2O \rightarrow 6H^+ + CO_2 + 6e^- \quad (2)$$

In either case, the reaction on the oxidant electrode is represented by the following Formula (3).

$$3/2 O_2 + 6H^+ + 6e^- \rightarrow 3H_2O \quad (3)$$

In particular, direct type fuel cells, which can generate protons from an aqueous methanol solution and thus do not demand a converter or the like, are advantageous in applying it into portable electronic devices. They are also characteristic in that the energy density thereof is extremely higher as they use a liquid aqueous methanol solution as the fuel.

Because a direct type fuel cell has an output voltage of 1 V or less per unit cell, and thus a plurality of cells should be connected to each other in series to generate such a high voltage for the application to portable devices such as cell phones. Stationary fuel cells for vehicles and homes generally have a stack structure wherein respective unit cells are connected in the vertical direction, but in fuel cells for portable devices, the unit cells are often connected on the same plane because of the restriction of the thickness of devices.

A cell pack wherein a plurality of cells is connected with electric connecting members has been proposed as the fuel cell connected in a plane (Patent Document 1). In the cell pack described in Patent Document 1, a current collector plate is provided at the outside of a fuel diffusion member placed in contact with the catalyst layer, and the anodic current collector plate of one cell is connected to the cathodic current collector plate of the other cell with an electrically connecting member. The current-collecting efficiency is improved and the contact resistance with the connection member is reduced by using a carbon paper as the fuel diffusion member and placing a current collector plate outside thereof.

For use in a portable device, it is requested to be thinner, smaller, and lighter. Specifically, for a cell phone, which is so light that its terminal weight is approximately 100 g, the fuel cell should be decreased in weight in order of gram unit and in thickness in order of millimeter unit.

However, in the configuration described in Patent Document 1, each cell has a complicated structure consisting of at least five layers: current collector plate/fuel diffusion member/catalyzed membrane/fuel diffusion member/current collector plate. In addition, the current collector plate should have a certain degree of thickness to make the electrical contact between the carbon fuel diffusion member and the metal current collector plate favorable; and an fastening member is needed to fasten a current collector plate with another. Because an electrically connecting member is placed between cells, it was necessary to place a space in a particular size between cells, which resulted in increase in the size, thickness, and weight of the cell pack, not realizing sufficient reduction in size, weight and thickness.

Patent Document 1: Japanese Patent Application Laid-Open (JP-A) No. 2001-283892

SUMMARY OF THE INVENTION

As described above, it was difficult to reduce the size, weight, and thickness of conventional fuel cells. Also, it was still room for improving the efficiency in using the catalyst and the current-collecting characteristics of fuel cell.

The present invention has been achieved in view of the foregoing circumstances, with an object to provide a technique of improving the output characteristics of a fuel cell. Another object of the present invention is to provide a technique of reducing the size and weight of a fuel cell. Yet another object of the present invention is to provide a technique of simplifying the configuration or the method of manufacture of a fuel cell.

According to the present invention, there is provided a fuel cell comprising a plurality of unit cells, each including: a solid electrolyte membrane; a first electrode having a first catalyst layer, provided on one face of the solid electrolyte membrane; and a second electrode having a second catalyst layer, provided on the other face of the solid electrolyte membrane and facing the first electrode, the fuel cell further comprising, a base member having the first catalyst layer in one of the unit cell on one face and having the second catalyst layer in the other of the unit cell adjacent to said unit cell on the other face.

Further, according to the present invention, there is provided a fuel cell comprising: a solid electrolyte membrane; a plurality of first electrodes having a first catalyst layer, provided on one face of the solid electrolyte membrane; and a plurality of second electrodes having a second catalyst layer, provided on the other face of the solid electrolyte membrane and facing the plurality of first electrodes, wherein a unit cell being configured by one of the first electrodes, one of the second electrodes and the solid electrolyte membrane, the one of the first electrodes and the one of the second electrodes being facing each other; and a base member is provided which has the first catalyst layer in one of the unit cell on one face and having the second catalyst layer in the other of the unit cell adjacent to said unit cell on the other face.

In addition, according to the present invention, there is provided a fuel cell comprising: a single solid electrolyte membrane; a plurality of first electrodes having a first catalyst layer, provided on one face of the solid electrolyte membrane; and a plurality of second electrodes having a second catalyst layer, provided on the other face of the solid electrolyte membrane and facing the plurality of first electrodes, respectively; wherein a unit cell being configured by one of the first electrodes, one of the second electrodes and the solid electrolyte membrane, the one of the first electrodes and the one of the second electrodes being facing each other; a plurality of the unit cells are connected in series along the periphery of the solid electrolyte membrane; and a base member is provided, the base member having the first catalyst layer in one of the unit cell on one face and having the second catalyst layer in the other of the unit cell adjacent to said unit cell on the other face.

According to the present invention, there is provided a fuel cell comprising a plurality of unit cells, each including a solid electrolyte membrane, a first electrode provided on one face of the solid electrolyte membrane, and a second electrode provided on the other face of the solid electrolyte membrane and facing the first electrode, wherein the first electrode of one of the unit cell and the second electrode of the other of the unit cell are electrically connected to each other via a connecting member; and the first and second electrodes and the connecting member are formed continuously and integrally.

In the present invention, the term "facing" means that the first and second electrodes are formed facing each other via a solid electrolyte membrane.

In the present invention, the term "continuously and integrally" means formed as a continuous and unified structure. Preferably, the structure is constituted of a single member without connecting portion.

In the fuel cell according to the present invention, the first and second electrodes in different unit cells are formed continuously and integrally via a connecting member and electrically connected, thus, giving a serial connection structure superior in electrical contact between unit cells. In traditional fuel cells, which demanded use of a connecting member for connection of unit cells or connection of the electrodes, caused contact resistance at the connecting point of members, but in the fuel cell according to the present invention, the flow routes of electrons from the first electrode via the connecting member to the second electrode are continuously, allowing improvement in the output characteristics of the cell. In addition, the components are much simpler and easier to produce.

In the fuel cell according to the present invention, one of the first and second electrodes is a fuel electrode and the other is an oxidant electrode. The fuel fed to the fuel electrode is not particularly limited, but, for example, a liquid fuel can be supplied.

According to the present invention, there is provided a fuel cell comprising: a plurality of first electrodes provided on one face of a single solid electrolyte membrane; and a plurality of second electrodes provided on the other face of the solid electrolyte membrane and facing the plurality of first electrodes, respectively, wherein a unit cell being configured by one of the first electrodes, one of the second electrodes and the solid electrolyte membrane, the one of first electrodes and the one of second electrodes being facing each other; the first electrode of one of the unit cell and the second electrode of the other of the unit cell are electrically connected to each other via a connecting member; and the first and second electrodes and the connecting member are formed continuously and integrally.

In the fuel cell according to the present invention, a plurality of unit cells is formed on a single solid electrolyte membrane. Because the first electrode constituting one of the unit cell and the second electrode constituting the other of the unit cell are electrically connected via a connecting member and the first and second electrodes and the connecting member are formed continuously and integrally, unit cells in a same plane are connected in series and the conductivity between the unit cells is kept favorably, thus giving the fuel cell a serial connection structure superior in output characteristics.

According to the present invention, there is provided a fuel cell comprising a plurality of unit cells, each including: a solid electrolyte membrane; a first electrode provided on one face of the solid electrolyte membrane; and a second electrode provided on the other face of the solid electrolyte membrane and facing the first electrode, wherein the first electrode constituting one of the unit cell and the second electrode constituting the other of the unit cell are formed continuously and integrally by a single electrode sheet.

In the fuel cell according to the present invention, the electrode sheet has two regions that may be catalytic electrode. These are the first and second electrodes. Of the first and second electrodes, one represents the fuel electrode in one unit cell and the other the oxidant electrode in another unit cell. Because the single electrode sheet is formed continuously and integrally, the first and second electrodes are connected electrically.

Thus, the fuel cell according to the present invention, wherein the first and second electrodes corresponding to different unit cells are formed continuously and integrally in the single electrode sheet, has a serial connection structure superior in electrical contact between cells. Absence of a connection member for connecting cells makes the configuration of members and the production thereof much simpler and causes no resistance between the members, and thus improves the output characteristics of the cell. In this invention, the shape of the electrode sheet is not particularly limited, and may be in any shape, for example, polygonal.

In the fuel cell according to the present invention, the base member may have cut a portion, and the solid electrolyte membrane may be inserted into the cut portion.

Also, according to the invention, there is provided a method of manufacturing a fuel cell, comprising a step of forming a first electrode and a second electrode by providing a cut portion in a base member, inserting a solid electrolyte membrane into the cut portion, and providing counter electrodes facing the first electrode and the second electrode, respectively, via the solid electrolyte membrane.

In this manner, it is possible to easily form the first electrode on one face of the solid electrolyte membrane and the second electrode on the other face. Further, by adjusting the width, length, size, or the like of the cut, it is also possible to arbitrarily control the distance between the first electrode and the second electrode formed continuously and integrally, and thus, to control integration density of the unit cells and reduce the size of the fuel cell further by increasing the integration density. In the invention, the shape of the cut portion is not particularly limited, and may be selected arbitrarily, for example, a straight or a slit.

According to the invention, there is provided a fuel cell comprising: a single solid electrolyte membrane; a plurality of first electrodes provided on one face of the solid electrolyte membrane; and a plurality of second electrodes provided on the other face of the solid electrolyte membrane and facing the plurality of first electrodes, respectively, wherein a unit cell being configured by one of the first electrodes, one of the second electrodes and the solid electrolyte membrane, the one of first electrodes and the one of second electrodes being facing each other; a plurality of the unit cells arranged along the periphery of the solid electrolyte membrane are connected in series; the first electrode of one of the unit cell and the second electrode of the other of the unit cell adjacent to the aforementioned unit cell are electrically connected to each other via a connecting member; and the first and second electrodes and the connecting member are formed continuously and integrally.

The method of manufacturing the fuel cell according to the invention may further comprise step of inserting the base member along the periphery of the solid electrolyte membrane.

In conventional fuel cells, if the solid electrolyte membrane is in a shape having corners such as polygon, a serial connected structure of unit cells is formed along one side of the solid electrolyte membrane, and thus it was difficult to form serial connection continuously along two sides forming an corner. In the fuel cell according to this invention, wherein the first and second electrodes constituting different unit cells are formed continuously and integrally by a single electrode sheet, it is possible to adapt to the various shapes of the solid electrolyte membrane and to form a serial connection structure wherein the unit cells are aligned along the periphery of the solid electrolyte membrane.

In the fuel cell according to the invention, the first and second electrodes and the connecting member may be formed continuously and integrally by a single porous metal sheet.

The resistance of the porous metal sheet is much lower by one digit or more than those of carbon papers traditionally used, and thus the porous metal sheet can act both as a gas diffusion electrode and a current collector electrode. Thus, use of a porous metal sheet eliminates the need for a current collector electrode, for example, of bulk metal and allows reduction in size, weight and thickness of the fuel cell. It also secures the electron flow routes in the first or second electrode favorably and improves the current-collecting characteristics. In addition, the porous metal sheet diffuses water or gas efficiently because of its porosity, and thus, forms the flow routes for water and gas favorably in the first or second electrode. Thus, use of a porous metal sheet improves the power generation efficiency of unit cell. It also provides a fuel cell superior in the conductivity between cells connected in series.

The surface of carbon materials such as carbon paper used in conventional cells was hydrophobic, making it difficult to hydrophilize the surface. In contrast, the surface of the porous metal sheet for use in the fuel cell according to the invention is more hydrophilic than that of carbon materials. As a result, when a liquid fuel, for example, containing methanol or the like is fed to the fuel electrode, permeation of the liquid fuel into the fuel electrode is more accelerated than into conventional electrodes, thus, improving the efficiency in fuel supply.

In the fuel cell according to the present invention, the first and second electrodes may comprise a porous metal sheet and a catalyst supported on the surface of the metal constituting the porous metal sheet. In the fuel cell according to the present invention, the base member may be a porous metal sheet.

Also in the fuel cell according to the present invention, a catalyst may be supported on the metal surface of the porous metal sheet. In conventional fuel cells, wherein a catalyst and the metal constituting porous metal sheet are connected via carbon particles, the electrons should migrate from the catalyst to the metal of porous metal sheet via the carbon particles. The contact resistance at the time between the carbon particles and the catalyst and between the porous metal sheet and the carbon particles were relatively large. On the other hand, in the configuration according to the invention, the catalyst can move deposited directly to the porous metal sheet, and the contact resistance between them is relatively smaller, so allowing electrons to migrate more efficiently. Further, it is possible to form multiple unit cells connected in series easily by inserting the solid electrolyte membrane thereto. A conductive covering layer may be formed on the surface of the porous metal sheet in the present invention, and in such a case, the catalyst is supported via the covering layer on the surface of the metal constituting porous metal sheet. For example, in the electrode for the fuel cell according to the present invention, a catalyst-plated layer may be formed on the surface of the metal constituting porous metal sheet. In this manner, it is possible to make a desired catalyst supported on a porous metal sheet easily and reliably.

In the fuel cell according to the present invention, a catalyst layer containing catalyst-supporting carbon particles may be formed on the surface of the porous metal sheet.

The fuel cell according to the present invention may have a proton conductor in contact with the catalyst additionally. In this way, it is possible to form a so-called three-phase interface among electrode, fuel, and electrolyte reliably and sufficiently, and secure the flow routes of the protons generated on the catalyst surface favorably, consequently, providing a fuel cell electrode superior in electrode properties and improving the output characteristics of the fuel cell. For example, in the fuel cell according to the invention, the proton conductor may be an ion-exchange resin.

In the fuel cell according to the present invention, the metal constituting porous metal sheet may have a roughened surface. The fuel cell according to the present invention, in which the surface of the metal of porous metal sheet is roughened, has an increased surface area capable of supporting a greater amount of catalyst. As a result, it is possible to support a sufficient amount of catalyst on the porous metal sheet without use of a member for ensuring a high surface area such as carbon particles and thus to improve the electrode properties. Alternatively, a catalyst layer not containing carbon particles may be formed on the surface. In such a way, a catalyst is supported directly on the surface of the metal constituting porous metal sheet, so when used as the fuel electrode, for example, the electrons generated in an electrochemical reaction at the interface between the catalyst and the electrolyte migrate reliably and rapidly to the porous metal sheet. Alternatively when used as an oxidant electrode, the electrons supplied from an external circuit to the porous metal sheet are guided to the connected catalyst reliably and rapidly. Also, because the proton conductor is formed in contact with the catalyst, the flow routes of the protons generated on the catalyst surface are also secured. Thus, the electrode for the fuel cell according to the present invention can utilize the electrons and protons generated in the electrochemical reaction more efficiently and improve the output characteristics of the fuel cell.

In the fuel cell according to the invention, at least part of the porous metal sheet may be hydrophobic treated. It is thus possible to form both hydrophilic and hydrophobic regions in an electrode easily. Thus, water flow routes are securely formed in the oxidant electrode, which suppresses flooding, therefore it is possible to exhibit superior output characteristics consistently.

In the fuel cell according to the invention, a fuel may be supplied directly to the surface of the first or second electrode. For example, if the first electrode constitutes a fuel electrode, the fuel may be supplied directly to the surface of the first electrode. In a typical configuration for supplying the fuel directly, for example, a fuel container or a fuel-supplying member is formed at a position in contact with the electrode sheet of the fuel electrode, and the fuel is supplied to the fuel electrode without a current-collecting member such as end plate. Through-holes or guiding grooves in the stripe shape may be formed on the surface of the electrode sheet. In this manner, it is possible to supply a fuel from the electrode sheet surface further more efficiently.

In addition, in the fuel cell according to the invention, an oxidant may be supplied directly to the surface of the first or second electrode. For example, when the first electrode constitutes an oxidant electrode, the oxidant may be supplied directly to the surface of the first electrode. The direct supply of an oxidant means that an oxidant such as air or oxygen is supplied directly to the surface of the oxidant electrode, without an end plate or the like.

In the fuel cell according to the present invention, a low-ionic conductance region may also be formed in the regions between neighboring unit cells. The low-ionic conductance region may be a region in the solid electrolyte membrane where a groove or a concave is formed. Such a configuration can suppress the migration of protons between unit cells through the solid electrolyte membrane and provide a high-output fuel cell that is prevented from voltage drop effectively.

As described above, the fuel cell according to the invention comprises a base member having the first catalyst layer in one of the unit cell on one face and having the second catalyst layer in the other of the unit cell adjacent to said unit cell on the other face, which exhibits improved output characteristics. The invention also allows reduction in size and weight of the fuel cell. Further, the invention also allows simplification of the configuration and the manufacturing process for the fuel cell.

BRIEF DESCRIPTION OF THE DRAWINGS

The present and other objects, characteristics and advantages of the present invention described above will become more apparent by the favorable embodiments described below and the accompanying drawings.

FIG. 4 is a schematic view illustrating a fuel cell according to an embodiment;

FIG. 11 is a schematic sectional view illustrating a configuration of the fuel electrode and the solid electrolyte membrane in the fuel cell according to an embodiment.

DETAILED DESCRIPTION OF THE INVENTION

The invention relates to a fuel cell having a plurality of unit cells. Hereinafter, the invention will be described, taking a fuel cell having a plurality of unit cells connected in series as an example. Electrodes for different unit cells are formed in a single electrode sheet continuously and integrally. The electrode sheet is a conductive sheet having two regions to be catalytic electrode region partly thereon. One catalytic electrode region constitutes a fuel electrode of one of the unit cell, while the other catalytic electrode region an oxidant electrode of the other of the unit cell.

First Embodiment

Figure 1:
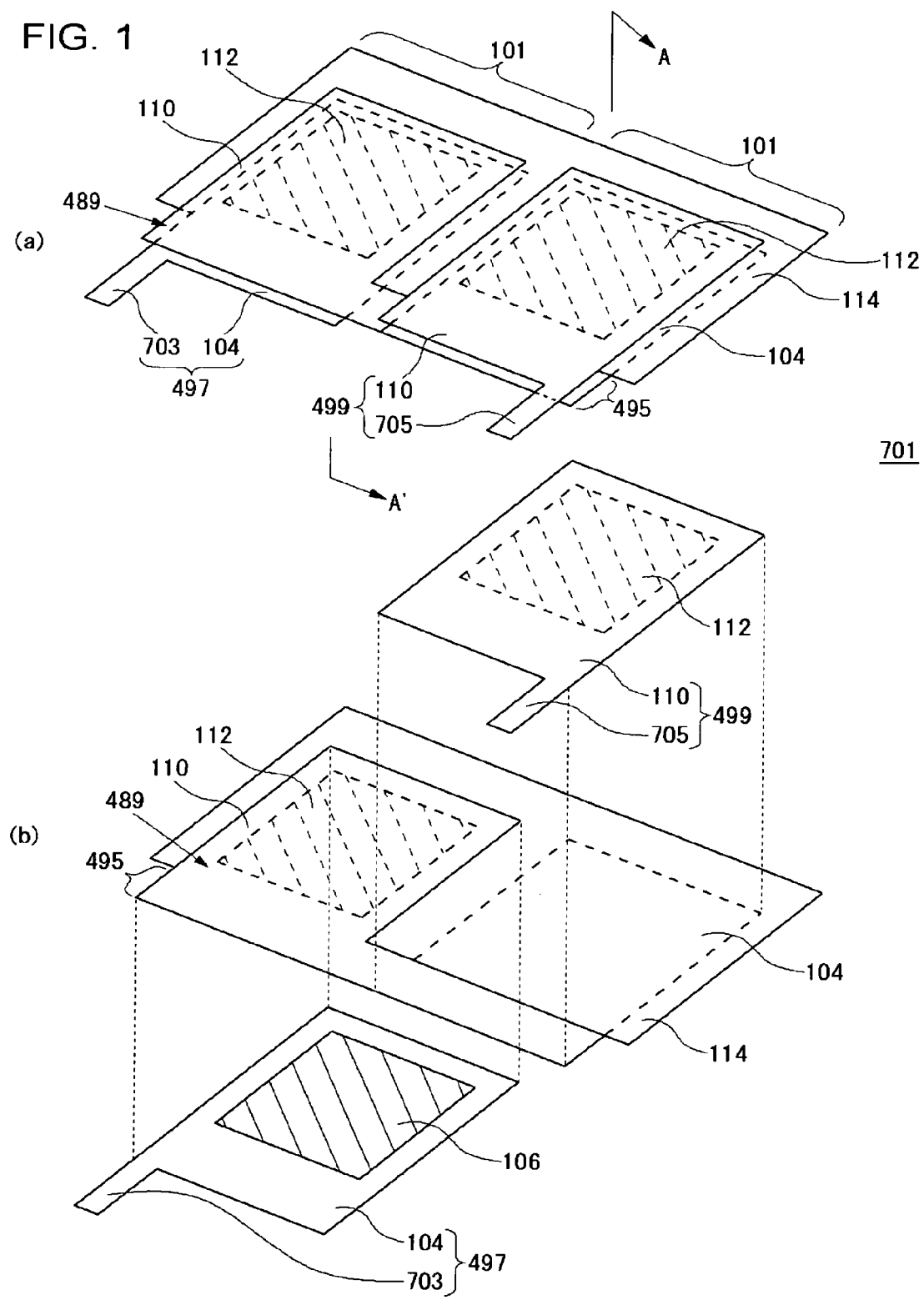
FIG. 1 is a schematic perspective view illustrating a configuration of a fuel cell according to an embodiment.

The present embodiment relates to a fuel cell having two unit cells connected in series. FIG. 1 is a schematic view illustrating a configuration of a fuel cell according to the present embodiment. FIG. 1(*a*) is a perspective view illustrating a configuration of a fuel cell 701, while FIG. 1(*b*) is a perspective view illustrating the fuel cell shown in FIG. 1(*a*) while fuel electrode side and oxidant electrode side current collector electrode sheets 497 and 499 are separated.

As shown in FIG. 1(*a*), a fuel cell 701 has two unit cells 101 on a single solid electrolyte membrane 114. As shown in FIG. 1(*b*), the fuel cell 701 has five parts: a single oxidant electrode side current collector electrode sheet 499, a single electrode sheet 489, a single solid electrolyte membrane 114, a single fuel electrode side current collector electrode sheet 497, and a single oxidant electrode side current collector electrode sheet 499. The electrode sheet 489 is a sheet used for connecting the two unit cells 101 continuously and integrally, and the fuel electrode side current collector electrode sheet 497 and the oxidant electrode side current collector electrode sheet 499 are sheets for collecting and supplying the power generated in the fuel cell 701 to outside.

The electrode sheet 489 is rectangular in shape and has a cut from a long side toward the opposite side. Base members 104 and 110 are disposed at each side of the cut and connected with a connecting area 495, which is located close to the opposite side where there is not the cut. A catalyst layer (not shown in Figure) is formed on the surface of the base member 104, constituting the fuel electrode of one unit cell 101. In addition, a catalyst layer 112 is formed on the surface of the base member 110, which constitutes the oxidant electrode of the other unit cell 101. As will be described below, in the fuel cell 701, the base member 104 is the base member for the fuel electrode side, and the base member 110 is the base member for the oxidant electrode side. A solid electrolyte membrane 114 is inserted into the cut of the electrode sheet 489 in such a way that the solid electrolyte membrane 114 becomes in contact with the catalyst layer (not shown in Figure) on base member 104 and the catalyst layer 112 on base member 110.

The base member 110 for the oxidant electrode side current collector electrode sheet 499 is placed at a position facing the base member 104 in electrode sheet 489, and the base member 104 in electrode sheet 489, the solid electrolyte membrane 114, and the base member 110 for the oxidant electrode side current collector electrode sheet 499 form one unit cell 101. Similarly, the base member 110 in electrode sheet 489, the solid electrolyte membrane 114, and the fuel electrode side current collector electrode sheet 497 form the other unit cell 101.

A catalyst layer 106 on fuel electrode side current collector electrode sheet 497 is connected via the solid electrolyte membrane 114 to the position facing the base member 110 in electrode sheet 489. Similarly, the catalyst layer 112 on oxidant electrode side current collector electrode sheet 499 is connected via the solid electrolyte membrane 114 to the position facing the base member 104 in electrode sheet 489.

The electrode sheet 489 consists of the base member 104, the base member 110, and the connecting area 495 that are formed continuously and integrally. Such a configuration, which can be obtained easily by making a cut in a rectangular electrode sheet from its long side, is suitable for miniaturization of the fuel cell, because the base member 104 and the base member 110 are connected to each other via a side orthogonal to the cut and thus there is no need to provide a space storing an additional connecting member for connecting the unit cells as in conventional fuel cells.

On the other hand, the fuel electrode side current collector electrode sheet 497 and the oxidant electrode side current collector electrode sheet 499 have shapes respectively corresponding to the base member 110 and the base member 104 in electrode sheet 489. Thus as shown in FIG. 1, the fuel electrode side current collector electrode sheet 497 and the oxidant electrode side current collector electrode sheet 499 have only one electrode formed and no cut. The catalyst layer 106 or 112 is formed at a position corresponding to each of the catalyst layers on electrode sheet 489. In addition, the fuel electrode side current collector electrode sheet 497 and the oxidant electrode side current collector electrode sheet 499 have respectively a fuel electrode side terminal 703 and an oxidant electrode side terminal 705 for connecting the power generated in the electrochemical reaction in fuel cell 701 to external load.

The electrode sheet 489, the fuel electrode side current collector electrode sheet 497, and the oxidant electrode side current collector electrode sheet 499 play a function both as a gas diffusion layer and a current collector electrode. The electrode sheet 489 has an electric resistance one digit smaller than that of carbon paper, which is commonly used as a gas diffusion layer in conventional fuel cells, and thus the electrons generated in electrochemical reaction are conveyed more reliably.

In the fuel cell 701, the fuel electrodes and the oxidant electrodes in neighboring unit cells 101 are connected to each other via the connecting area 495 in electrode sheet 489. Even if the width of the connecting area 495 is smaller, electrons move through the connecting area 495 between the unit cells 101 efficiently. In this way, the fuel cell 701 can be more miniaturized than conventional fuel cells.

In addition, because the connecting area 495 is formed continuously and integrally with the base members 104 and 110, there is no contact resistance between the base members, which occurs if an additional connection member is placed. As shown in FIG. 1(a), the fuel electrode side terminal 703 and the oxidant electrode side terminal 705 are formed continuously and integrally with the fuel electrode side current collector electrode sheet 497 and the oxidant electrode side current collector electrode sheet 499, respectively. Accordingly, there is no need for additional terminal members serving as terminals for connecting the electrodes as in conventional fuel cells, resulting in higher current-collecting efficiency because of the absence of contact resistance between a terminal and an electrode. Thus, electricity is supplied more efficiently from the fuel electrode side terminal 703 and the oxidant electrode side terminal 705.

Further, as electrons are collected more efficiently from the fuel electrode side terminal 703 and the oxidant electrode side terminal 705, there is no need for using a current-collecting member such as bulk metal plate or a fasten member for closely connecting the current-collecting members that is used in conventional fuel cells. In this way, a number of thin, small, and light cells are connected on the same plane with fewer members.

Figure 3:
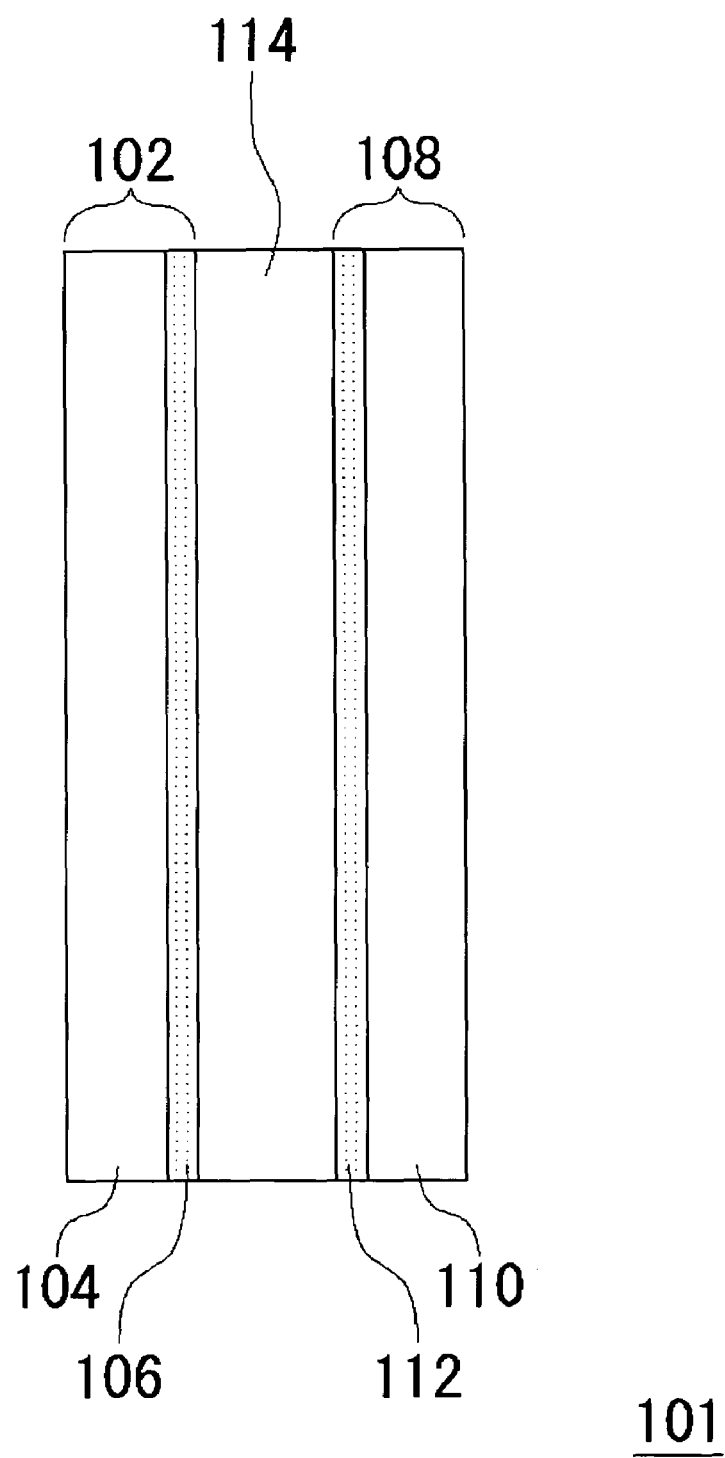
FIG. 3 is a sectional view illustrating a configuration of a unit cell shown in FIG. 1.

Hereinafter, the configuration of the unit cell 101 will be described in more detail with reference to FIG. 3. FIG. 3 is a sectional view illustrating the configuration of the unit cell 101 in the fuel cell shown in FIG. 1. The unit cell 101 consists of a fuel electrode 102, an oxidant electrode 108 and the solid electrolyte membrane 114. The fuel electrode 102 or the oxidant electrode 108 is also called a catalytic electrode. In addition, the catalyst layers 106 and 112 are formed respectively on the base members 104 and 110, respectively constituting the fuel electrode 102 and the oxidant electrode 108. The regions of the base members 104 and 110 are formed on any of the electrode sheet 489, the fuel electrode side current collector electrode sheet 497, or the oxidant electrode side current collector electrode sheet 499 described above. The catalyst layers 106 and 112 may contain, for example, catalyst-supporting carbon particles and solid polymer electrolyte fine particles.

The electrode sheet for use as the electrode sheet 489, the fuel electrode side current collector electrode sheet 497, and the oxidant electrode side current collector electrode sheet 499 is not particularly limited when it is a metal sheet having holes penetrating both faces for transmission of fuel, oxidant, or protons, and a variety of sheets different in shape and thickness may be used. An example thereof is a porous metal sheet. A nonwoven sheet or woven fabric of metal fiber may be used as the porous metal sheet. Use of a porous metal sheet leads to reliable improvement in the electrode properties of electrode sheet 489, for example, conductivity and the formation of hydrogen ion flow routes therein. In addition, these porous metal sheets have a relatively high porosity, allowing reduction in the weight of electrode.

The pore size in the electrode sheet 489 may be, for example, 1 mm or less in width. In this way, it is possible to keep favorable diffusion of fuel liquid or fuel gas.

The porosity of the electrode sheet 489 may be, for example, 10% or more and 70% or less. A porosity of 10% or more permits favorable diffusion of the fuel liquid or fuel gas; and a porosity of 70% or less permits preservation of favorable current-collecting action. The porosity is more preferably, for example, 30% or more and 60% or less. In the range above, it is possible to keep more favorable diffusion of the fuel liquid or fuel gas and favorable current-collecting action. The porosity of electrode sheet 489 is a rate of all pores in the total volume of the electrode sheet 489. A higher porosity means that the electrode sheet 489 has a coarser structure. The porosity is a rate of the pores in the total volume, and thus, a higher porosity means a coarser structure. The porosity can be calculated, for example, from the weight and volume of the electrode sheet 489 and the specific gravity of the metal. Alternatively, it may be determined by a mercury penetration method.

The thickness of the electrode sheet 489 is, for example, 1 mm or less. It is possible to reduce the thickness and weight of the unit cell 101 favorably, by reducing the thickness of electrode sheet to 1 mm or less. It is possible to reduce the thickness and weight further by reducing the thickness to 0.5 mm or less and to use such a fuel cell in portable devices more favorably. The thickness may be, for example, 0.1 mm or less.

Examples of the materials for the electrode sheet 489 include one or more elements selected from the group consisting of Ti, Zr, Hf, V, Nb, Ta, Cr, Mo, W, Mn, Fe, Co, Ni, Al, Au, Ag, Cu, and Pt. All of these elements have favorable conductivity. To contain an element selected from Au, Ag, and Cu among them is preferable, as it reduces the specific electrical resistance of electrode sheet 489. It is also possible to make the metal for electrode sheet 489 have a higher oxidation-reduction potential, by adding an element selected from Au, Ag, and Pt to the current collector. In this manner, it is possible to improve the corrosion resistance of the electrode sheet 489 even when part of the electrode sheet 489 surface is not covered with a catalyst and thus exposed. When an alloy is used, for example, alloys containing SUS, alloys containing iron, chromium and silicon, or the like are preferable.

The electrode sheet 489, the fuel electrode side current collector electrode sheet 497, and the oxidant electrode side current collector electrode sheet 499 may be made of the same materials or different materials.

The electrode sheet 489 in fuel cell 701 described above is a rectangular disk, but the electrode sheet 489 is not particularly limited in shape when the base members 104 and 110 and the connecting area 495 are formed thereon, and may be polygonal or in any other shape. The cut formed in the electrode sheet 489 is also in any shape and may be straight, a slit, or in other shape.

When a porous metal sheet is used as the electrode sheet 489, a hydrophobic substance may be embedded in the pores of the base members 104 and 110 in electrode sheet 489. The base members 104 and 110 have surfaces more hydrophilic than those of the carbon paper and others used in conventional cells. Thus, it is possible to secure both flow routes of gas and water favorably by adhering a hydrophobic substance on part of the hydrophilic surface. In particular, it becomes possible to discharge the water generated in the electrochemical reaction more efficiently from the base member 110 of the oxidant electrode 108.

Similarly, the fuel electrode side current collector electrode sheet 497 and the oxidant electrode side current collector electrode sheet 499 are not particularly limited in shape.

Examples of the catalysts for the fuel electrode 102 include metals, alloys, or the oxides thereof containing at least one element selected from Pt, Ti, Cr, Fe, Co, Ni, Cu, Zn, Nb, Mo, Ru, Pd, Ag, In, Sn, Sb, W, Au, Pb, and Bi. On the other hand, the catalysts similar to those for the fuel electrode 102 may be used as the catalyst for the oxidant electrode 108, and examples thereof include the substances exemplified above. The catalysts for the fuel electrode 102 and the oxidant electrode 108 may be the same as or different from each other.

Examples of the catalyst-supporting carbon particles include acetylene black (Denka Black (registered trademark; manufactured by Denki Kagaku Kogyo), XC72 (manufactured by Vulcan), etc.), Ketjen black, amorphous carbon, carbon nanotube, carbon nanohorn, and the like. The particle diameter of the carbon particles is, for example, 0.01 μm or more and 0.1 μm or less and preferably 0.02 μm or more and 0.06 μm or less.

The solid polymer electrolyte, which plays a role of connecting the catalyst-supporting carbon particles to the solid electrolyte membrane 114 electrically on the catalytic electrode surface and supplying an organic liquid fuel to the catalyst surface, should have proton conductivity as well as a certain permeability of the organic liquid fuel such as methanol for the fuel electrode 102 and a certain oxygen permeability for the oxidant electrode 108. Materials superior in proton conductivity and the permeability of an organic liquid fuel such as methanol are used favorably as the solid polymer electrolyte for satisfying these requirements. Typical examples of the favorable materials include organic polymers having a polar group such as a strong acid group (such as sulfonic acid and phosphonic acid) or a weak acid group (such as carboxyl group). Typical examples of the organic polymers include fluorine-containing polymers having a fluoroplastic structure and a protonic acid group, and the like. Alternatively, polyether ketone, polyether ether ketone, polyether sulfone, polyether ether sulfone, polysulfone, polysulfide, polyphenylene, polyphenylene oxide, polystyrene, polyimide, polybenzoimidazole, polyamide, or the like may be used. Alternatively, a non-fluorine-containing hydrocarbon material may be used as the polymer for reduction of crossover of the liquid fuel such as methanol. Yet alternatively, an aromatic group-containing polymer may be used as the polymer of base member.

Examples of the polymer for the base member to which the protonic acid group binds include: nitrogen or hydroxyl group-containing resins such as polybenzoimidazole derivatives, polybenzoxazole derivatives, crosslinked polyethyleneimine derivatives, polysilamine derivatives, amine-substituted polystyrenes (such as polydiethylaminoethylstyrene), and nitrogen-substituted polyacrylate (such as polydiethylaminoethyl methacrylate); hydroxyl group-containing polyacrylic resins such as silanol-containing polysiloxanes and polyhydroxyethyl methacrylate; hydroxyl group-containing polystyrene resins such as poly(p-hydroxy styrene); and the like.

The polymers exemplified above further substituted with a crosslinkable substituent group such as a vinyl group, an epoxy group, an acryl group, a methacryl group, a cinnamoyl group, a methylol group, an azide group, or a naphthoquinonediazide group may also be used, as needed. In addition, resins having the crosslinked substituent groups above may also be used.

Typical examples of the polymers for the first solid polymer electrolyte 150 or the second solid polymer electrolyte 151 include:
Sulfonated polyether ketone;
Sulfonated polyether ether ketone;
Sulfonated polyether sulfone;
Sulfonated polyether ether sulfone;
Sulfonated polysulfone;
Sulfonated polysulfide;
Sulfonated polyphenylene;
Aromatic group-containing polymers such as sulfonated poly (4-phenoxybenzoyl-1,4-phenylene) and alkyl-sulfonated polybenzoimidazole;
Sufoaklylated polyether ether ketone;
Sufoaklylated polyether sulfone;
Sufoaklylated polyether ether sulfone;
Sufoaklylated polysulfone;
Sufoaklylated polysulfide;
Sufoaklylated polyphenylene;

Sulfonic acid group-containing perfluorocarbons (Nafion (registered trademark; manufactured by E.I. du Pont de Nemours and Company), Aciplex (manufactured by Asahi Kasei Corp.), or the like.);

Carboxyl group-containing perfluorocarbon (Flemion (registered trademark) S film (manufactured by Asahi Glass Co., LTD.), or the like.);

Copolymers such as polystyrenesulfonic acid copolymers, polyvinylsulfuric acid copolymers, crosslinked alkylsulfuric acid derivatives, and copolymers of fluorine-containing polymers having a fluoroplastic structure and a sulfonic acid;

Copolymers of an acrylamide such as acrylamide-2-methylpropanesulfonic acid and an acrylate such as n-butyl methacrylate;

and the like. Alternatively, aromatic polyether ether ketone or aromatic polyether ketone may be used.

Among them, sulfone group-containing perfluorocarbons (such as Nafion (registered trademark; manufactured by E. I. du Pont de Nemours and Company) and Aciplex (manufactured by Asahi Kasei Corp.), or the like), carboxyl group-containing perfluorocarbons (such as Flemion (registered trademark) S film (manufactured by Asahi Glass Co., LTD)) and the like are preferable from the viewpoints of ionic conductivity and others.

The solid polymer electrolytes for the fuel electrode 102 and the oxidant electrode 108 may be the same as or different from each other.

The solid electrolyte membrane 114 plays a role of separating the fuel electrode 102 and the oxidant electrode 108 and transmitting protons between the two. Thus, the solid electrolyte membrane 114 is preferably a film higher in proton conductivity. Preferably, it is also chemically stable and higher in mechanical strength.

The material for the solid electrolyte membrane 114 preferably contains a protonic acid group such as a sulfonic acid group, a sulfoalkyl group, a phosphoric acid group, a phosphonic acid group, a phosphine group, a carboxyl group, or a sulfonimide group. Examples of the polymers for the base member to which the protonic acid group binds include polyether ketone, polyether ether ketone, polyether sulfone, polyether ether sulfone, polysulfone, polysulfide, polyphenylene, polyphenylene oxide, polystyrene, polyimide, polybenzoimidazole, polyamide, and the like. The polymer is preferably a non-fluorine-containing hydrocarbon film for reduction of crossover of the liquid fuel such as methanol. An aromatic group-containing polymer may also be used as the polymer for base member.

The polymers for the base member to which the protonic acid group binds include:

nitrogen or hydroxyl group-containing resins such as polybenzoimidazole derivatives, polybenzoxazole derivatives, crosslinked polyethyleneimine derivatives, polysilamine derivatives, amine-substituted polystyrenes (such as polydiethylaminoethylstyrene), and nitrogen-substituted polyacrylates (such as polydiethylaminoethyl methacrylate);

hydroxyl group-containing polyacrylic resins such as silanol-containing polysiloxanes and polyhydroxyethyl methacrylate;

hydroxyl group-containing polystyrene resins such as poly (p-hydroxy styrene);

and the like.

In addition, the polymers described above may have as needed a crosslinkable substituent group such as a vinyl group, an epoxy group, an acryl group, a methacryl group, a cinnamoyl group, a methylol group, an azide group, or a naphthoquinonediazide group. In addition, resins having the crosslinked substituent groups may also be used.

Typical examples of the polymer for the solid electrolyte membrane 114 include:

Sulfonated polyether ether ketone;
Sulfonated polyether sulfone;
Sulfonated polyether ether sulfone;
Sulfonated polysulfone;
Sulfonated polysulfide;
Sulfonated polyphenylene;
Aromatic group-containing polymers such as sulfonated poly (4-phenoxybenzoyl-1,4-phenylene) and alkylsulfonated polybenzoimidazoles;
Sufoaklylated polyether ether ketone;
Sufoaklylated polyether sulfone;
Sufoaklylated polyether ether sulfone;
Sufoaklylated polysulfone;
Sufoaklylated polysulfide;
Sufoaklylated polyphenylene;
Sulfonic acid group-containing perfluorocarbons (such as Nafion (registered trademark; manufactured by E. I. du Pont de Nemours and Company) and Aciplex (manufactured by Asahi Kasei Corp.), and the like);

carboxyl group-containing perfluorocarbons (Flemion (registered trademark) S film (manufactured by Asahi Glass Co., LTD.), and the like);

copolymers such as polystyrenesulfonic acid copolymers, polyvinylsulfuric acid copolymers, crosslinked alkylsulfuric acid derivatives, and copolymers of a fluorine-containing polymer having a fluoroplastic structure and a sulfonic acid;

copolymers of an acrylamide such as acrylamide-2-methylpropanesulfonic acid and an acrylate such as n-butyl methacrylate;

and the like. Alternatively, aromatic polyether ether ketone or aromatic polyether ketone may be used.

In the present embodiment, a material smaller in organic liquid fuel permeability is preferably used as the solid electrolyte membrane 114 and the first solid polymer electrolyte 150 or the second solid polymer electrolyte 151 for reduction of the crossover. The material is preferably, for example, an aromatic condensation polymer such as sulfonated poly (4-phenoxybenzoyl-1,4-phenylene) or an alkylsulfonated polybenzoimidazole. The solid electrolyte membrane 114 and the second solid polymer electrolyte 151 have preferably, for example, a methanol-swelling tendency of 50% or less and more preferably 20% or less (swelling tendency in an aqueous 70 vol % MeOH solution). In this manner, the solid polymer membrane has a particularly favorable interfacial adhesiveness and proton conductivity.

For example, hydrogen may be used as the fuel for use in the present embodiment. Alternatively, reformed hydrogen prepared from natural gas, naphtha, or the like as the fuel source may be used. Alternatively, for example, a liquid fuel such as methanol may be supplied directly. For example, oxygen, air, or the like maybe used as the oxidant.

Figure 6:
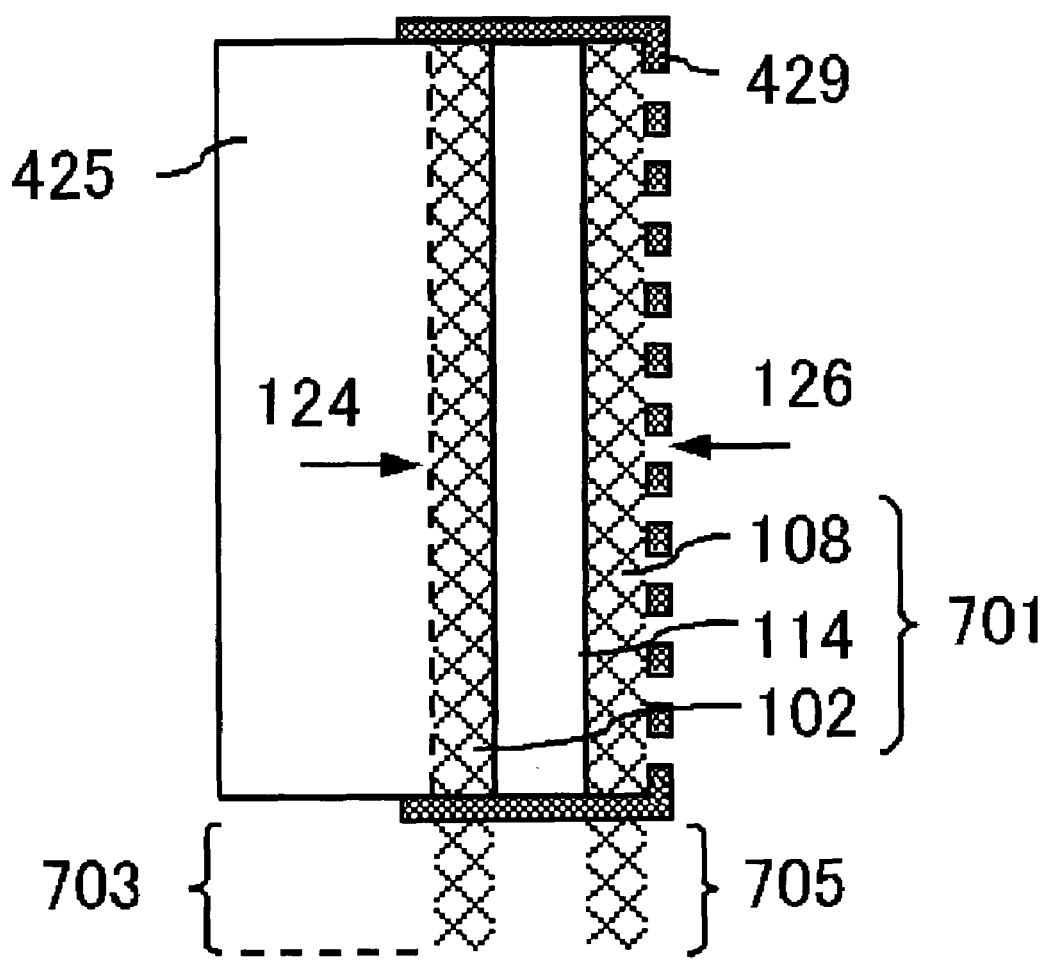
FIG. 6 is a sectional view illustrating a configuration of the fuel cell according to an embodiment.

If a liquid fuel is directly supplied, the fuel cell may have, for example, the configuration shown in FIG. 6. FIG. 6 is a sectional view illustrating a configuration of a fuel cell 700 according to the present embodiment. The cross section corresponds to the face cut in the A-A' direction of the fuel cell 701 shown in FIG. 1(*a*). In the fuel cell 700 of FIG. 6, a fuel 124 is supplied via a fuel container 425 to the fuel electrode 102. Exposed area of the oxidant electrode 108 in the unit cell 101 is covered with a seal 429 that has pores for supplying an oxidant 126, and thus oxygen in air is supplied thereto as the oxidant 126. The power generated in the fuel cell 700 is output from a fuel electrode side terminal 703 and an oxidant electrode side terminal 705.

In the fuel cell 700, presence of the seal 429 at the terminal prevents leakage of the fuel to the oxidant electrode 108 side. It also eliminates the need for a current collector electrode, for example, of a bulk metal plate. The fuel cell 700 having such a configuration is smaller and lighter, and exhibits a higher output reliably. Accordingly, it provides a fuel cell in the structure having multiple cells on the same plane that is favorably used as a power source for portable devices such as cell phones and notebook computers.

Alternatively, the fuel 124 may be injected as needed through a fuel inlet, making the fuel inlet to the fuel container 425. The fuel 124 may be stored in the fuel container 425 or supplied as needed to the fuel container 425. That is, the fuel 124 supply is not restricted to the method that the fuel is stored in the fuel container 425, and may be selected suitably from methods including the method of forming a fuel supply line. For example, the fuel may be supplied from a fuel cartridge to the fuel container 425.

Only one solid electrolyte membrane 114 is used in the present embodiment, but a plurality of solid electrolyte membranes 114 different from each other may be used in respective unit cells 101. Use of one solid electrolyte membrane 114 makes the configuration and production thereof much simpler.

In addition, the shapes of the solid electrolyte membrane 114, the electrode sheet 489 and the fuel electrode side and oxidant electrode side current collector electrode sheets 497 and 499 are not limited to those described above and decided arbitrarily.

Figure 2:
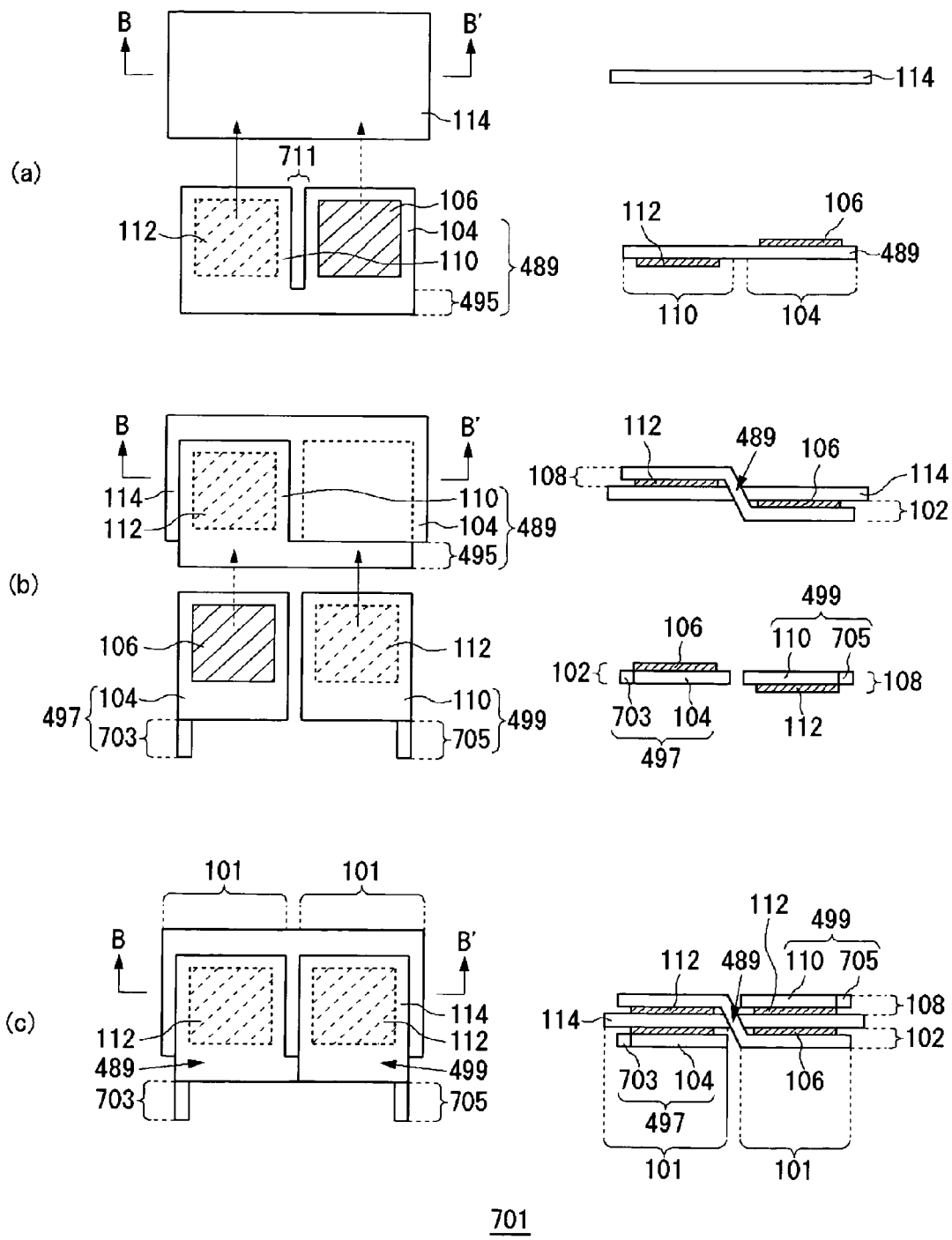
FIG. 2 is a drawing illustrating a manufacturing method for the fuel cell shown in FIG. 1.

The process for manufacturing the fuel cell is not particularly limited, but the fuel cell 701 can be produced, for example, as follows. FIG. 2 is a drawing illustrating the preparation method for the fuel cell 701 shown in FIG. 1. In FIGS. 2(a) to 2(c), the left Figures are respectively top views and the right Figures sectional views of the face cut in the B-B' direction of the fuel cells in the top views.

A porous metal sheet is cut into a sheet of a particular size, and the electrode sheet 489 shown in FIG. 2(a) and the fuel electrode side current collector electrode sheet 497 and the oxidant electrode side current collector electrode sheet 499 shown in FIG. 2(b) are prepared. A cut 711 is formed in the electrode sheet 489 at the time in such a manner that the base members 104 and 110 are connected via the connecting area 495. The fuel electrode side and oxidant electrode side current collector electrode sheets 497 and 499 are cut in such a manner that the fuel electrode side terminal 703 and the oxidant electrode side terminal 705 are protruding respectively from the base members 104 and 110.

The carbon particles are impregnated with a catalyst by the immersion method commonly practiced in the art. Then, the catalyst supporting carbon particles and the solid electrolytes are dispersed in a solvent, to give a paste, which is then coated and dried on a base member, to give the fuel electrode 102 and the oxidant electrode 108. The particle diameter of the carbon particles is, for example, 0.01 µm or more and 0.1 µm or less. The particle diameter of the catalyst particles is, for example, 1 nm or more and 10 nm or less. The particle diameter of the solid polymer electrolyte particles is, for example, 0.05 µm or more and 1 µm or less. The carbon particles and the solid polymer electrolyte particles are used at a ratio in the range of, for example, 2:1 to 40:1 by weight. The weight ratio of water to solutes in the paste is approximately, for example, 1:2 to 10:1.

The method of coating the paste on the base members 104 and 110 is not particularly limited, and may be performed, for example, by brush coating, spray coating, screen printing, or the like. The paste is coated, for example, to a thickness of 1 µm or more and 2 mm or less. At the time, the paste is coated on the base members 104 and 110 respectively on the different faces of the electrode sheet 489. After coating, the paste is heated at a heating temperature for a heating period suitable for the fluoroplastic resin used, to produce the fuel electrode 102 or the oxidant electrode 108. The heating temperature and period are selected suitably according to the material used, but the heating temperature may be, for example, 100° C. or more and 250° C. or less, and the heating period is 30 seconds or more and 30 minutes or less.

In this manner, the electrode sheet 489 having the fuel electrode 102 and the oxidant electrode 108 formed and the fuel electrode side and oxidant electrode side current collector electrode sheets 497 and 499 are prepared. Hydrophobic regions may be formed, by embedding a hydrophobic substance in the pores of these electrode sheets. For example, the electrode sheet 489 may be subjected to water-repellent treatment. The water-repellent treatment results in co-presence of the hydrophilic surface of the catalyst (not shown in Figure) or the electrode sheet 489 surface and the water-repellent surface, which in turn results in secure introduction of the water drainage routes in catalytic electrodes. Thus, water generated, for example, in the oxidant electrode 108 can be discharged favorably from the electrode outward. The water-repellent treatment is performed, for example, on the outer surface of the oxidant electrode 108 in the fuel cell 701.

The water-repellent treatment of the electrode sheet 489 may be performed, for example, by immersing the electrode sheet 489 in or bringing it into contact with a solution or suspension of a hydrophobic substance such as polyethylene, paraffin, polidimethylsiloxane, PTFE, tetrafluoroethylene-perfluoroalkylvinylether copolymer (PFA), ethylene fluoride propylene (FEP), poly(perfluorooctylethyl acrylate)(FMA), or polyphosphazene, and thus adhering the water-repellent resin on the surface of the metal constituting the electrode sheet 489. In particular, use of a highly water-repellent substance such as PTFE, tetrafluoroethylene-perfluoroalkylvinylether copolymer (PFA), ethylene fluoride propylene (FEP), poly(perfluorooctylethyl acrylate)(FMA), or polyphosphazene is effective in forming the hydrophobic region favorably.

Alternatively, a dispersion of the pulverized powders of a hydrophobic material such as PTFE, PFA, FEP, fluorinated pitch, or polyphosphazene may be coated. The coating liquid may be a mixed dispersion of a hydrophobic material and a conductive substance such as metal or carbon. Alternatively, the coating liquid may be a dispersion of the pulverized powder of a water-repellent conductive fiber, for example Dreamaron (registered trademark; manufactured by Nissen), in a solvent. In this way, it is possible to increase cell output further by using the conductive and water-repellent substances.

Alternatively, pulverized powders of a conductivity substance such as metal or carbon that are previously coated with the hydrophobic material described above may be dispersed and coated. The application method is not particularly limited, and may be performed, for example, by brush coating, spray coating, and screen printing or the like.

In addition, a hydrophobic group may be introduced onto the surface of the electrode sheet 489 by a plasma method (for example, $CF_4$ plasma treatment). In this way, it is possible to adjust the thickness of the hydrophobic area to a desirable thickness.

The solid electrolyte membrane 114 may be prepared by any method selected suitably according to the material used. For example, when a solid electrolyte membrane 114 is made of an organic polymeric material, it can be prepared by casting and drying a solution or dispersion of an organic polymeric material in a solvent on a release seat such as polytetrafluoroethylene.

After one side of the solid electrolyte membrane 114 obtained is inserted into the slit 711 of the electrode sheet 489 (FIG. 2(a)), the solid electrolyte membrane 114 is sandwiched between the fuel electrode 102 and the oxidant electrode 108 on electrode sheet 489. The assembly is hot-pressed in the same state, to give a catalytic electrode-solid electrolyte membrane assembly (FIG. 2(b)).

The hot press condition is selected according to the material used, and when the solid electrolyte membrane 114 and the solid polymer electrolyte on the catalytic electrode surface are made of organic polymers having a softening temperature or a glass transition temperature, the hot press may be performed at a temperature higher than the softening temperatures or the glass transition temperatures of these polymers. Typically, it is performed, for example, at a temperature of 100° C. or more and 250° C. or less and a pressure of 1 kg/cm$^2$ or more and 100 kg/cm$^2$ or less for 10 seconds or more and 300 second or less.

Then, the fuel electrode side current collector electrode sheet 497 is placed to face the base member 110 of the electrode sheet 489 via the solid electrolyte membrane 114. Similarly, the oxidant electrode side current collector electrode sheet 499 is placed to face the base member 104 of the electrode sheet 489. Then, the catalyst layers 106 and 112 formed on the fuel electrode side and oxidant electrode side current collector electrode sheets 497 and 499 are connected to the solid electrolyte membrane 114 (FIG. 2(b)). Subsequently, the assembly is hot-pressed.

In this manner, the fuel cell 701 is obtained (FIG. 2(c)). Although a method of separately hot-pressing the electrode sheet 489 and the fuel electrode side and oxidant electrode side current collector electrode sheets 497 and 499 is described so far, the fuel cell 701 may be produced by hot-pressing them all at once by placing them at the predetermined positions respectively. In this manner, it is possible to produce the fuel cell 701 more efficiently.

In addition, a method of forming the catalyst layers 106 and 112 on the electrode sheet 489 and then inserting the solid electrolyte membrane 114 into the cut 711 of the electrode sheet 489 is described so far. Alternatively, a method of forming the catalyst layers 106 and 112 at predetermined positions of the solid electrolyte membrane 114 and then inserting it into the cut 711 of electrode sheet 489 may also be employed.

In such a case, the catalyst layers 106 and 112 can be formed on the solid electrolyte membrane 114, for example, as follows: First, the catalyst paste prepared by the method described above is coated on the surface, for example, of a water-repellent sheet. For example, a Teflon (registered trademark) sheet may be used as the water-repellent sheet. Coating may be performed as described above. The catalyst paste coated on the water-repellent sheet is then heated and dried, to give the catalyst film 106 or 112. The catalyst layers 106 and 112 are then placed to face each other via the solid electrolyte membrane 114 and connected by hot pressing. Subsequent separation of the water-repellent sheet gives the solid electrolyte membrane 114 bound to the catalyst layers 106 and 112.

As shown in FIG. 6, after the fuel container 425 is connected to the fuel electrode 102 of the unit cells 101 constituting the fuel cell 701 (not shown in FIG. 6), the exposed area on fuel cell 701 may be sealed. At the time, for example, the fuel electrode 102 and the fuel container 425 may be adhered to each other with adhesives and the like resistant to the fuel. The direct contact between the fuel electrode 102 and the fuel container 425 and thus direct supply of the fuel permit production of a thinner, smaller, and lighter fuel cell 700.

The oxidant electrode 108, which is in direct contact with an oxidant or air, is supplied with an oxidant. An oxidant may be supplied to the oxidant electrode 108 via a packaging member as needed, if it does not inhibit miniaturization of the fuel cell.

Second Embodiment

In this embodiment, a porous metal sheet is used as the electrode sheet 489, the fuel electrode side current collector electrode sheet 497, and the oxidant electrode side current collector electrode sheet 499 in the fuel cell 701 described in the first embodiment; a catalyst is supported directly on the surface of the metal constituting the porous metal sheet; and these sheets have roughened surfaces. The "roughened sheet surface" means that the individual surface of the metal constituting the sheet is roughened. A roughened surface has an increased surface area and thus supports a greater amount of catalyst, consequently leading to improvement in fuel cell output by acceleration of the electrochemical reaction in each unit cell 101.

Figure 7:
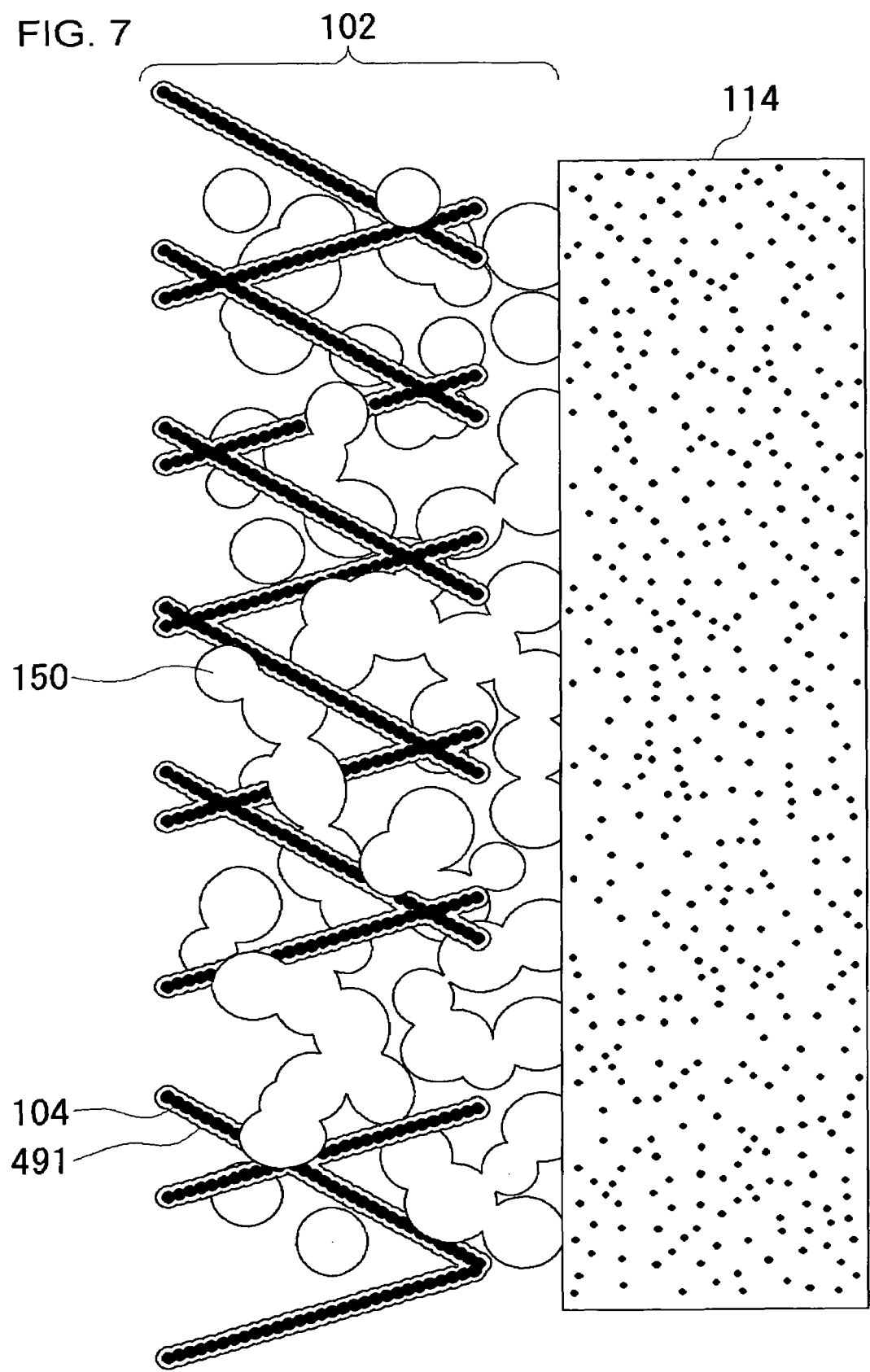
FIG. 7 is a schematic sectional view illustrating configurations of a fuel electrode and a solid electrolyte membrane of the fuel cell shown in FIG. 1.

FIG. 7 is a schematic sectional view illustrating a fuel electrode 102 and a solid electrolyte membrane 114 in a unit cell constituting the fuel cell of the present embodiment. As shown in the Figure, the base member 104 of the fuel electrode 102 has an irregular surface, which is coated with a catalyst 491. Solid polymer electrolyte particles 150 are adhered to the surface of the catalyst 491. The base member 104 may be part of the electrode sheet 489 or part of the fuel electrode side current collector electrode sheet 497, but has the same configuration in any case.

Figure 8:
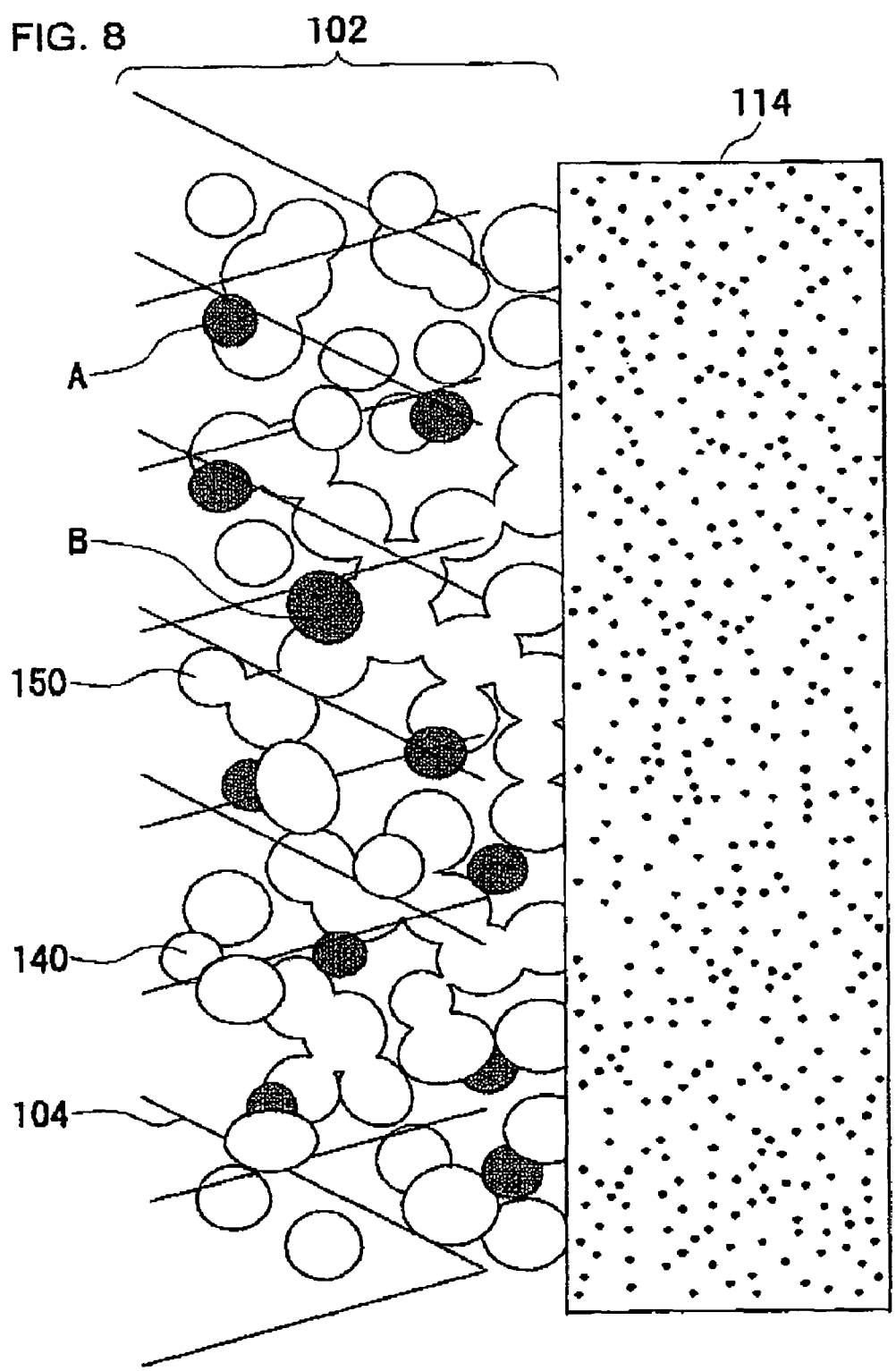
FIG. 8 is a schematic sectional view illustrating configurations of the fuel electrode and the solid electrolyte membrane in a conventional fuel cell.

Alternatively, FIG. 8 is a schematic sectional view illustrating a configuration of the fuel electrode 102 of conventional fuel cell. In FIG. 8, a carbon material is used as the base member 104, and a catalyst layer consisting of the solid polymer electrolyte particles 150 and catalyst supporting carbon particles 140 is formed on the surface.

Hereinafter, the features of the fuel cell of the present embodiment will be described, taking the fuel electrode 102 as an example, with reference to FIGS. 7 and 8. First in FIG. 7, a porous metal sheet is used as the base member 104. The porous metal sheet is superior in conductivity and thus does not demand installation of an additional external current collector electrode, for example, of a bulk metal in the fuel cell 701, as described in the first embodiment. On the other hand, in FIG. 8, a carbon material used as the base member 104 demands installation of an additional current collector electrode.

In FIG. 7, the surface of the base member 104, that is, the metal constituting the porous metal sheet, is also roughened. Thus, the base member 104 has an increased surface area and supports a greater amount of catalyst. Thus, the base member 104, which has a surface area capable of supporting a sufficient amount of catalyst 491, supports the catalyst 491 in an amount almost equivalent to that when the catalyst supporting carbon particles 140 are used as in FIG. 8. The surface of the base member 104 may be water-repellent finished.

In addition, because the electrochemical reaction in the fuel electrode 102 occurs at a so-called three-phase interface, namely, at the interface of catalyst 491, solid polymer electrolyte particle 150 and base member 104, it is important to ensure the three-phase interface securely. In FIG. 7, because the base member 104 and the catalyst 491 contact each other directly, all the contact areas between the catalyst 491 and the solid polymer electrolyte particles 150 represent three-phase interfaces, permitting establishment of the electron flow routes between base member 104 and catalyst 491.

On the other hand, in FIG. 8, among the catalyst supporting carbon particles 140, only the particles in contact with both solid polymer electrolyte particle 150 and base member 104 are effective. Accordingly, for example, the electrons generated on the surface of the catalysts (not shown in Figure) supported by catalyst supporting carbon particles A are supplied from the catalyst supporting carbon particles A via the base member 104 out of the cell, but in the case of the particles that do not have a contact point with the base member 104 such as catalyst supporting carbon particles B, the electrons generated on the surface of the catalysts supported on the carbon particle surface (not shown in Figure) cannot be discharged out of the cell. Alternatively in the case of the catalyst supporting carbon particle A, the contact resistance between the catalyst supporting carbon particles 140 and the base member 104 is larger than that between the catalyst 491 and the electrode sheet 489, and thus, the configuration in FIG. 7 is more effective in securing the electron flow routes.

Thus, comparison between the FIGS. 7 and 8 reveals that the configuration in FIG. 7 improves the utilization efficiency and current-collecting efficiency of the catalyst 491. The configuration thus improves the output characteristics of the unit cell 101 and the cell characteristics of the fuel cell as well. It also eliminates the step of forming a catalyst layer and thus can simplify the cell configuration and the method of manufacture thereof.

The catalyst 491 may be supported on the surface of the base member 104 and cover all or part of the base member 104. The entire surface of the electrode sheet 489 is preferably covered as shown in FIG. 7, because it prevents corrosion of the electrode sheet 489. When the catalyst 491 covers the surface of base member 104, the thickness of the catalyst 491 layer is not particularly limited, but may be, for example, 1 nm or more and 500 nm or less.

The fuel cell according to the present embodiment is prepared fundamentally in a similar manner to the full cell described in the first embodiment, and only the steps different therefrom will be described hereinafter.

In the fuel cell of the present embodiment, the surfaces of the metals for the electrode sheet 489, the fuel electrode side current collector electrode sheet 497, and the oxidant electrode side current collector electrode sheet 499 are roughened, and thus these sheets are given irregular surfaces. Hereinafter, the roughening operation will be described, taking the electrode sheet 489 as an example, but the fuel electrode side and oxidant electrode side current collector electrode sheets 497 and 499 may be roughened in a similar manner. The surface of the electrode sheet 489 can be roughened into a fine irregular structure, for example, by etching such as electrochemical etching or chemical etching.

Electrolytic etching utilizing anodic polarization or the like may be used as the electrochemical etching. At the time, the electrode sheet 489 is immersed in an electrolyte solution and applied, for example, with a direct current voltage of approximately 1 to 10 V. Examples of the electrolyte solutions include acidic solutions, for example, of hydrochloric acid, sulfuric acid, supersaturated oxalic acid, phosphoric acid/chromic acid mixture, and the like.

Alternatively in chemical etching, the electrode sheet 489 is immersed in an etchant containing an oxidant. Examples of the etchants include nitric acid, nitric acid alcohol solution (Nital), picric acid alcohol (Picryl), ferric chloride solution, and the like.

In the present embodiment, a metal is also supported on the surface of the electrode sheet 489 as the catalyst 491. The catalyst 491 may be supported thereon, for example, by a plating method such as electroplating and electroless plating, a vapor deposition method such as vacuum deposition or chemical vapor deposition (CVD), or the like.

In electroplating, the electrode sheet 489 is immersed in an aqueous solution containing desirable catalyst metal ions and applied with a direct current voltage, for example, of approximately 1 to 10 V. For example in Pt plating, the electrode sheet 489 is immersed in acidic solution of sulfuric acid, sulfamic acid, and ammonium phosphate containing $Pt(NH_3)_2(NO_2)_2$, $(NH_4)_2PtCl_6$, and others and electroplated at an electric current density of 0.5 to 2 $A/dm^2$. Alternatively when a plurality of metals is to be plated, it is possible to electroplate at a desirable rate by adjusting the applied voltage, in the concentration range where one of the metals migrates in the diffusion-controlled state.

Yet alternatively in electroless plating, the electrode sheet 489 is immersed in an aqueous solution containing a desirable catalyst metal ion such as Ni, Co, or Cu that is previously added with a reducer such as sodium hypophosphite, sodium borohydride, or formalin. The aqueous solution may be heated as needed. For example, when an aqueous solution containing Cu ions and formalin is used, the plating may be performed in the solution at approximately 20 to 75° C.

In this manner, the surface of the electrode sheet 489 is roughened. Then, solid polymer electrolyte particles are deposited on the catalyst 491 surface of the base members 104 and 110, for example, by immersing the base members in a solid polymer electrolyte solution; and a catalytic electrode-solid electrolyte membrane assembly is obtained by holding and hot-pressing the base members between the fuel electrode 102 and the oxidant electrode 108.

Figure 9:
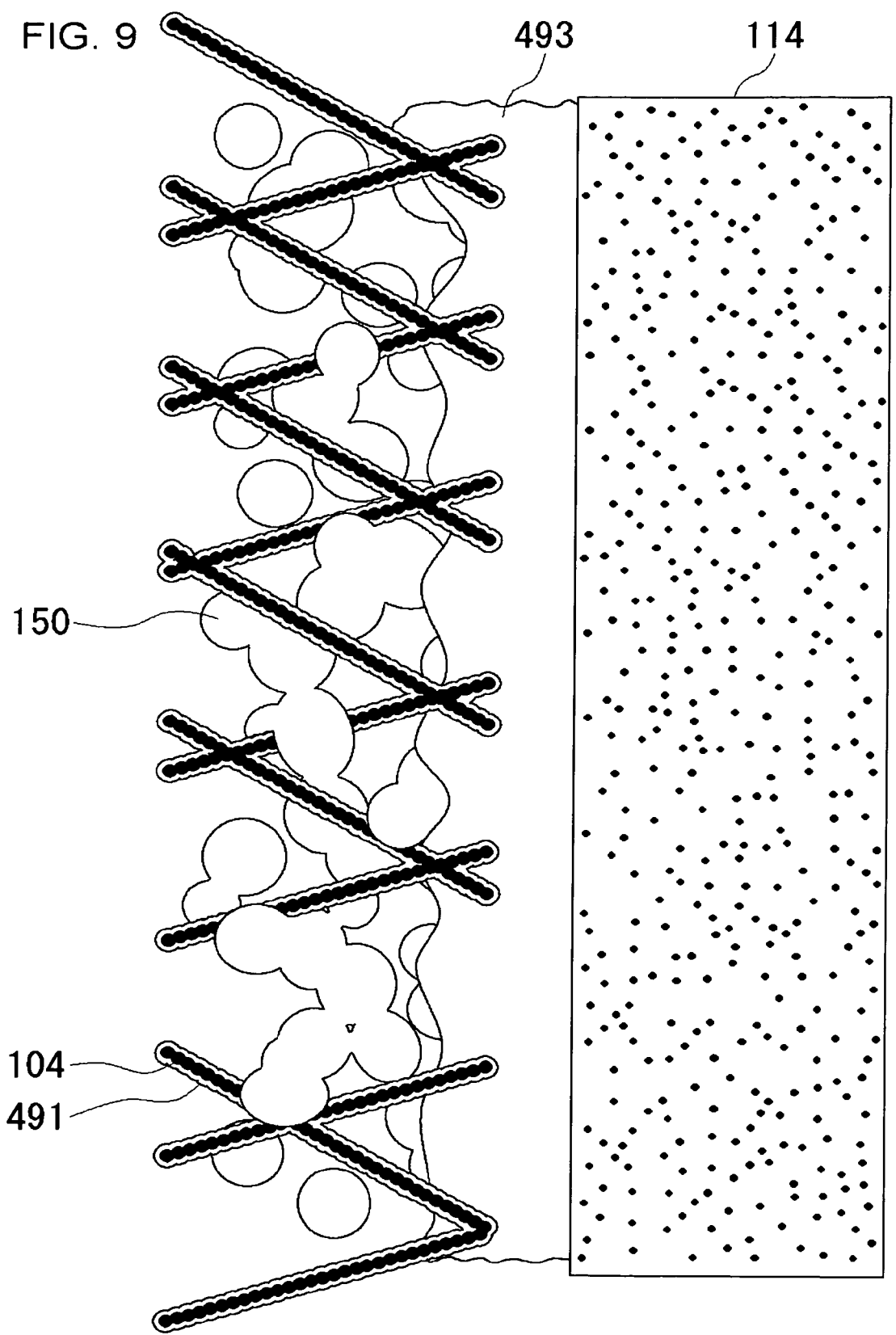
FIG. 9 is a schematic sectional view illustrating configurations of the fuel electrode and the solid electrolyte membrane of the fuel cell shown in FIG. 1.

It is preferable to form the flatten surfaces of the fuel electrode 102 and the oxidant electrode 108 by providing a proton conductor layer thereon, for securing the adhesion between both electrodes and the solid electrolyte membrane 114 and the hydrogen ion flow routes in the catalytic electrodes. FIG. 9 is a schematic sectional view illustrating another configuration of the fuel electrode 102 and the solid electrolyte membrane 114. The configuration shown in FIG. 9 is a configuration having a flattening layer 493 additionally on the surface of the base member 104 in the configuration shown in FIG. 6. Presence of the flattening layer 493 improves the adhesion between the solid electrolyte membrane 114 and the base member 104.

When the flattening layers 493 are formed on the surfaces of the base members 104 and 110, the flattening layer 493 maybe a proton conductor such as an ion-exchange resin. In this manner, the hydrogen ion flow routes are formed favorably between the solid electrolyte membrane 114 and the catalytic electrode. The material for the flattening layer 493 is selected, for example, from the materials used for the solid electrolyte or the solid electrolyte membrane 114.

Third Embodiment

The present embodiment relates to a fuel cell having multiple unit cells 101 connected in series. FIG. 4 is a drawing illustrating a configuration of a fuel cell 707 according to the present embodiment. FIG. 4(a) is a top view of the fuel cell 707, and FIG. 4(b) is a sectional view of the face cut in the C-C' direction of the fuel cell in FIG. 4(a). As shown in FIGS.

4(a) and 4(b), the fuel cell 707 has a configuration, wherein the four unit cells 101, each having the configuration of the fuel cell 701 described in the first embodiment as its basic configuration, are connected in series. In addition, the end portion of the fuel cell is enclosed with a seal 429 similarly to the fuel cell 700 shown in FIG. 6.

Three electrode sheets 489 are used in the fuel cell 707, and a base member 104 of one electrode sheet 489 and a base member 110 of the other electrode sheet 489 are provided so as to face each other via the solid electrolyte membranes 114. In the unit cells 101 at both ends, the base member 104 or the base member 110 is formed on a fuel electrode side current collector electrode sheet 497 or an oxidant electrode side current collector electrode sheet 499. In such a configuration, the four unit cells 101 are connected in a simplified configuration. The configuration secures the favorable electron flow routes between unit cells 101, enabling reduction in the size of the fuel cell compared to those of conventional fuel cells.

Thus, multiple small, light, and thin cells are formed while being connected on the same face in the fuel cell 707, similarly to the fuel cell 701. It is also possible to make the fuel cell exhibit high output reliably.

In the configuration of the fuel cell 707 wherein a plurality of the unit cells 101 is formed on the surface of a single solid electrolyte membrane 114, almost entire surface of the solid electrolyte membrane 114 can be covered with the base members 104 and 110. Namely, the fuel cell has a configuration wherein substantially entire surface of the solid electrolyte membrane 114 is covered with base members 104 and 110. Specifically, for example, 75% or more of the surface of the solid electrolyte membrane 114 may be covered with the base members 104 and 110. In this way, it is possible to integrate the unit cells 101 more densely on the solid electrolyte membrane 114 and thus to obtain a compact fuel cell superior in output characteristics.

In FIG. 4, the four unit cells 101 are connected, but the number of the unit cells 101 connected is not particularly limited, and may be selected suitably as needed. The electrode sheets 489 smaller by one in number than the number of cells can be used. It is also possible to further improve output characteristics by using the configuration of the fuel cell described in the second embodiment as its basic configuration, instead of that of the fuel cell 701.

Fourth Embodiment

Figure 5:
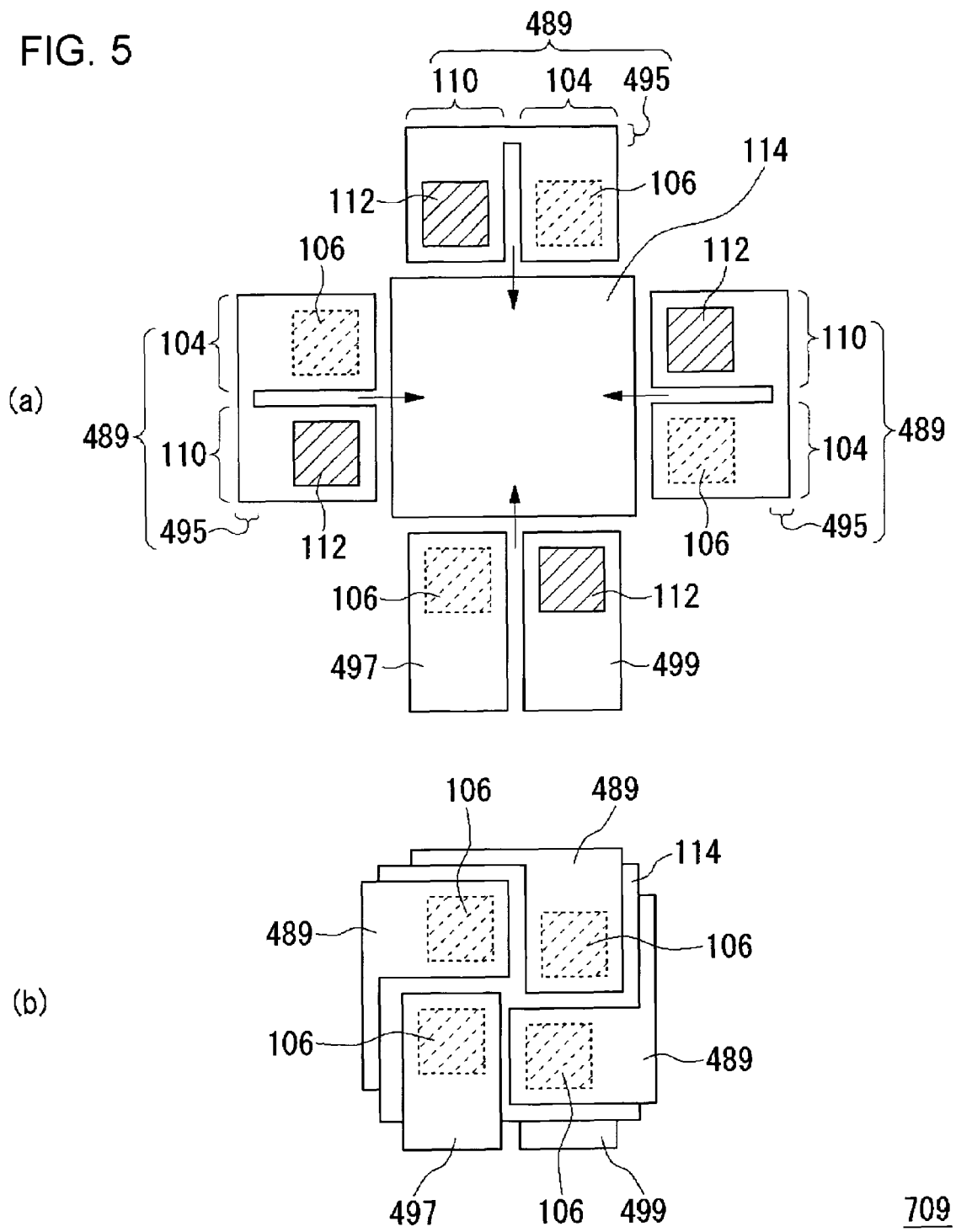
FIG. 5 is a schematic top view illustrating a configuration of a fuel cell according to an embodiment.

The present embodiment relates to another embodiment of a fuel cell having four unit cells 101 connected in series. FIG. 5 is a schematic top view illustrating the fuel cell according to the present embodiment. FIG. 5(a) is a drawing illustrating a configuration of a fuel cell 709 having the configuration of the fuel cell 701 as its basic configuration. FIG. 5(b) is a drawing illustrating electrode sheets 489 and fuel electrode side and oxidant electrode side current collector electrode sheets 497 and 499 connected to a solid electrolyte membrane 114 in the fuel cell 709 shown by FIG. 5(a), as they are separated from the solid electrolyte membrane.

As shown FIG. 5(a) and FIG. 5(b), the "windmill-shaped" configuration shown by the fuel cell 709 maybe used as a configuration wherein multiple unit cells 101 are connected in series. Even in the "windmill-shaped" configuration, it is possible to produce a fuel cell having a simple configuration that is superior in output characteristics, easily by using three electrode sheets 489, a fuel electrode side current collector electrode sheet 497 and an oxidant electrode side current collector electrode sheet 499.

In the "windmill-shaped" configuration, it becomes possible to collect current from a side of the solid electrolyte membrane 114, namely from the side where the fuel electrode side collector and oxidant electrode side electrode sheets 497 and 499 are deposited, and thus make a fuel electrode 102 and an oxidant electrode 108 close to each other and integrate the unit cells 101 densely in a plane. Because it is possible to make the fuel cell 709 almost square in shape, the fuel cell can be mounted in a narrower and smaller devices favorably.

The solid electrolyte membrane 114 having four cells connected in series in the rectangular disk shape is described in the present embodiment, but the shape of the solid electrolyte membrane 114 is not particularly limited, and the unit cells 101 may be mounted along the periphery of the solid electrolyte membrane 114. If the solid electrolyte membrane 114 has corners, as shown in the fuel cell 709, the favorable unit cell 101 configuration and connection of the electrodes sheets and the solid electrolyte membrane becomes possible, by depositing the electrode sheets to the two neighboring sides forming the corner of the solid electrolyte membrane 114. For example, if the solid electrolyte membrane 114 is polygonal in shape, the fuel electrode 102 of one unit cell 101 is placed on one side of the polygon and a corresponding oxidant electrode 108 on the side next to it. In this manner, it is possible to integrate the unit cells 101 more densely on the solid electrolyte membrane 114.

The invention has been described so far with reference to the embodiments. These embodiments are only examples of the present invention, and it should be understood for those who are skilled in the art that modifications of the present invention, for example in combination of the components and the treatment processes, are also included in the scope of the present invention.

Figure 10:
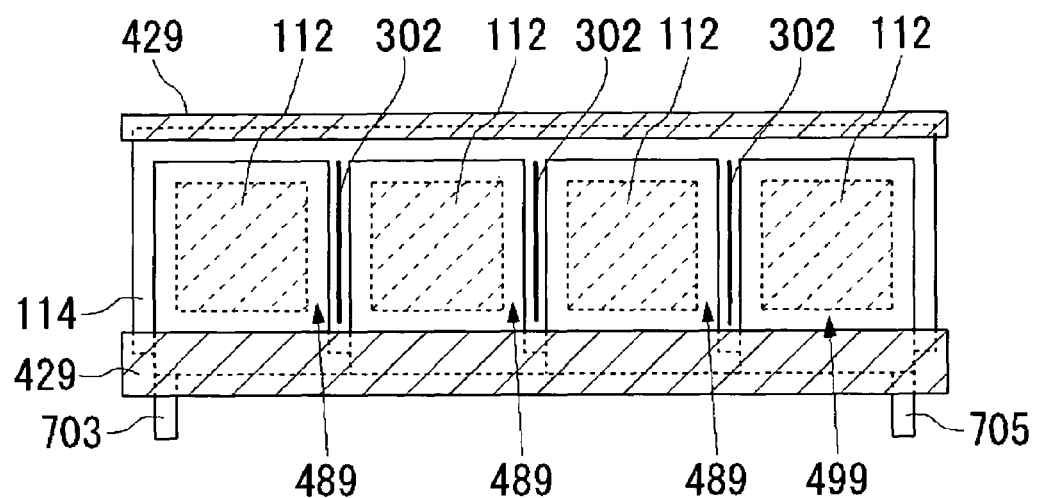
FIG. 10 is a schematic view illustrating a configuration of the fuel cell according to an embodiment.

For example, as shown in FIG. 10, a low-ionic conductance region 302 may be provided in the region between unit cells. In the configuration, it is possible to prevent decrease in voltage due to the electrical leakage that may occur when the fuel cell is further miniaturized by narrowing the spacing between unit cells. As a result, it becomes possible to suppress the decrease in voltage even when the width of the gap between unit cells is reduced almost to the thickness of the solid electrolyte membrane, and thus to produce smaller and thinner high-output fuel cell. Alternatively, the region above may be introduced by forming a groove or concave on the solid electrolyte membrane.

In addition, a fuel cell having a catalyst layer containing catalyst-supporting carbon particles is formed on the surface of a porous metal sheet has been described in the embodiments above, but a catalyst layer not containing carbon particles may be formed. As shown in FIG. 11, in such a configuration wherein the catalyst is supported directly on the surface of the metal for the porous metal sheet, for example when a porous metal sheet is used as the fuel electrode side current collector electrode sheet, the electrons generated in the electrochemical reaction at the interface of the catalyst and the electrolyte migrate to the fuel electrode side current collector electrode sheet faster and more reliably. Alternatively when it is used as the oxidant electrode side current collector electrode sheet, the electrons guided from the external circuit to the oxidant electrode side current collector electrode sheet are supplied to the connected catalyst faster and more reliably. In addition, as the proton conductor is formed in contact with the catalyst, the flow routes for the protons generated on the catalyst surface are also secured. Thus, the fuel cell electrode according to the present invention, utilizes the electrons and protons generated in the electrochemical reaction more efficiently and improves the output characteristics of the fuel cell.

Although configurations of multiple unit cells connected in series have been described in the above-described embodiment, it is also possible to produce a combination cell with a desirable voltage and capacity, by employing a configuration in combination of the unit cells connected both in series and in parallel, for example, by connecting some serial unit cells in parallel. Alternatively, a combination cell may be produced by connecting multiple fuel cells on the same plane, or a stack of the fuel cells by piling the unit cell structures 101 via a separator. Even when piled as a stack, the fuel cells exhibit superior output characteristics consistently.

EXAMPLE

Hereinafter, the fuel cell electrodes and fuel cells described in the embodiments above will be described in detail, but it should be understood that the invention is not limited thereby.

Example 1

In the present Example, a structure having unit cells connected in series shown in FIG. 4 is prepared and evaluated. A porous metal sheet of 0.2 mm in thickness made of sintered SUS316 fibers having a diameter of 30 µm were used as the catalytic electrodes, that is, electrode sheets for the fuel electrode and the oxidant electrode (gas diffusion electrode). A catalyst layer was formed on the surface of the porous metal sheet as follows: First, a colloidal dispersion of solid polymer electrolyte was prepared by using a 5-wt % alcohol solution of Nafion manufactured by Aldrich-chemical as the solid polymer electrolyte and mixing and stirring the solution with n-butyl acetate to a solid polymer electrolyte concentration of 0.1 to 0.4 mg/cm$^3$.

Carbon fine particles (Denka Black; manufactured by Denki Kagaku Kogyo) supporting an platinum-ruthenium alloy catalyst having a particle diameter of 3 to 5 nm in an amount of 50% by weight were used as the fuel electrode catalyst, while carbon fine particles (Denka Black; manufactured by Denki Kagaku Kogyo) supporting a platinum catalyst having a particle diameter of 3 to 5 nm in an amount of 50% by weight were used as the oxidant electrode catalyst. The catalyst supporting carbon fine particles were added to the colloidal solid polymer electrolyte dispersion, and the mixture was converted to a paste in an ultrasonic dispersing machine. The solid polymer electrolyte and the catalyst were mixed then at a weight ratio of 1:1. The paste was applied on the porous metal sheet by screen-printing in an amount of 2 mg/cm$^2$ and heated and dried thereon. In this manner, a catalyst layer was formed on each of the porous metal sheets for an electrode sheet, a fuel electrode side current collector electrode sheet, and a fuel electrode side current collector electrode sheet.

The electrode sheets obtained were inserted to one side of a solid electrolyte membrane Nafion 112 manufactured by E. I. du Pont de Nemours and Company at the cut, and a fuel electrode side current collector electrode sheet and an oxidant electrode side current collector electrode sheet were placed at predetermined location. The catalyst layer on the electrode sheet surface was then brought into contact with the solid electrolyte membrane. Subsequently, the assembly was hot-pressed on both faces at a temperature of 130° C. and a pressure of 10 kg/cm$^2$, to give a fuel cell.

The fuel cell thus obtained had a thickness less than half and a weight less than ⅓ of those of conventional fuel cells. In addition, the output of the fuel cell was determined. An aqueous 10 v/v % methanol solution was fed to the fuel electrode as the fuel and air to the oxidant electrode as the oxidant. The flow rates of the fuel and the oxidant were respectively 5 and 50 ml/min. The output of the fuel cell as determined at 1 atmospheric pressure and a room temperature of 25° C. was 1.6 V at a current of 1,000 mA/cm$^2$.

Example 2

A catalyst layer was formed on the porous metal sheet in a similar manner to Example 1, to give an electrode sheet, a fuel electrode side current collector electrode sheet, or a fuel electrode side current collector electrode sheet. The solid electrolyte membrane used was a solid electrolyte membrane Nafion 112 manufactured by E. I. du Pont de Nemours and Company. The electrode sheets obtained were inserted to three sides of the solid electrolyte membrane at the respective cuts, and the fuel electrode side current collector electrode sheet and the oxidant electrode side current collector electrode sheet were placed at predetermined locations. The catalyst layer on the electrode sheet surface was then brought into contact with the solid electrolyte membrane. Subsequently, the composite was hot-pressed on both faces at a temperature of 130° C. and a pressure of 10 kg/cm$^2$, to give the fuel cell having four cells connected in series shown in FIG. 5 for evaluation.

In this configuration too, the thickness of the fuel cell was not more than half and the weight not more than ⅓ of those of conventional fuel cells. After measurement in a similar manner to Example 1, the output voltage thereof was 1.6 V at an electric current density of 1000 mA/cm$^2$.

Comparative Example

A carbon paper (manufactured by Toray) was used as the electrode sheet for catalytic electrode, namely, for fuel electrode and oxidant electrode (gas diffusion electrode). A catalyst layer is formed on the surface of the electrode sheet in a similar manner to Example 1. The electrode was hot-pressed on both faces of a solid electrolyte membrane Nafion 112 manufactured by E. I. du Pont de Nemours and Company at a temperature of 130° C. and a pressure of 10 kg/cm$^2$, to give a catalytic electrode-solid electrolyte membrane assembly. Then, the two catalytic electrode-solid electrolyte membrane assemblies are connected to each other in series via connection terminals on the same face, and the end plates of the fuel and oxidant electrodes are connected with bolt and nut. The end plate used was a SUS304 plate of 1 mm in thickness.

The output voltage of the fuel cell obtained, as determined in a similar manner to Example 1, was 1.5 V at an electric current density of 1,000 mA/cm$^2$.

The Examples and the Comparative Example revealed that the fuel cells in Examples were smaller, lighter and thinner than conventional fuel cells, and exhibit high output consistently.

What is claimed is:

1. A fuel cell comprising a plurality of unit cells, each including:
    a solid electrolyte membrane,
    a first electrode, having a first catalyst layer, provided on one face of said solid electrolyte membrane, and
    a second electrode, having a second catalyst layer, provided on the other face of said solid electrolyte membrane and facing said first electrode,
    wherein said fuel cell further comprises a base member having said first catalyst layer in one of said unit cells on one face and having said second catalyst layer in another of said unit cells adjacent to said unit cell on the other face, wherein the first and second electrodes corresponding to different unit cells are formed on a single, integral electrode sheet, and wherein said base member has a cut portion, and said solid electrolyte membrane is inserted into said cut portion.

2. A fuel cell comprising:

a solid electrolyte membrane;

a plurality of first electrodes having a first catalyst layer, provided on one face of said solid electrolyte membrane; and a plurality of second electrodes having a second catalyst layer provided on the other face of said solid electrolyte membrane and facing said plurality of first electrodes, respectively, wherein:

a unit cell is configured by one of said first electrodes, one of said second electrodes and said solid electrolyte membrane, said one of said first electrodes and said one of said second electrodes being facing each other;

a base member is provided having said first catalyst layer in one of said unit cell on one face and having said second catalyst layer in the other of said unit cell adjacent to said unit cell on the other face;

the first and second electrodes corresponding to different unit cells are formed on a single, integral electrode sheet; and said base member has a cut portion, and said solid electrolyte membrane is inserted into said cut portion.

3. A fuel cell comprising:

a single solid electrolyte membrane;

a plurality of first electrodes having a first catalyst layer provided on one face of said solid electrolyte membrane; and a plurality of second electrodes having a second catalyst layer provided on the other face of said solid electrolyte membrane and facing said plurality of first electrodes, respectively, wherein:

a unit cell configured by one of said first electrodes, one of said second electrodes and said solid electrolyte membrane, said one of said first electrodes and said one of said second electrodes facing each other;

a plurality of said unit cells are connected in series along the periphery of said solid electrolyte membrane;

a base member is provided, said base member having said first catalyst layer in one of said unit cell on one face and having said second catalyst layer in the other of said unit cell adjacent to said unit cell on the other face;

the first and second electrodes corresponding to different unit cells are formed on a single, integral electrode sheet; and said base member has a cut portion, and said solid electrolyte membrane is inserted into said cut portion.

4. The fuel cell according to claim 1, wherein said base member is a porous metal sheet.

5. The fuel cell according to claim 4, wherein a catalyst-plated layer is formed on a metal surface constituting said porous metal sheet.

6. The fuel cell according to claim 4, wherein a metal constituting said porous metal sheet has a roughened surface.

7. The fuel cell according to claim 4, wherein at least part of said porous metal sheet is water-repellent finished.

8. A fuel cell according to claim 1, further comprising a proton conductor in contact with a catalyst.

9. The fuel cell according to claim 8, wherein said proton conductor is an ion-exchange resin.

10. The fuel cell according to claim 1, wherein
a low-ionic conductance region is provided in a region between neighboring unit cells.

11. The fuel cell according to claim 10, wherein
said low-ionic conductance region is a region where a groove is formed on said solid electrolyte membrane.

12. The fuel cell according to claim 10, wherein
said low-ionic conductance region is a region where a concave is formed in said solid electrolyte membrane.

13. A method of manufacturing a fuel cell, comprising:
a step of forming first and second electrodes by providing a cut portion in a base member,
inserting a solid electrolyte membrane into said cut portion, and
forming electrodes facing respectively said first and second electrodes via said solid electrolyte membrane,
wherein the first and second electrodes corresponding to different unit cells are formed on a single, integral electrode sheet.

14. The method of manufacturing a fuel cell according to claim 13 comprising a step of inserting said base member along a periphery of said solid electrolyte membrane.

15. The fuel cell according to claim 1, wherein the base member is distinct and separate from the solid electrolyte membrane.

16. The fuel cell according to claim 2, wherein the base member is distinct and separate from the solid electrolyte membrane.

17. The fuel cell according to claim 3, wherein the base member is distinct and separate from the solid electrolyte membrane.

18. The method of manufacturing a fuel cell according to claim 13, wherein the base member is distinct and separate from the solid electrolyte membrane.

19. The fuel cell according to claim 1, wherein the material for the solid electrolyte membrane comprises a protonic acid group selected from the group consisting of a sulfonic acid group, a sulfoalkyl group, a phosphoric acid group, a phosphonic acid group, a phosphine group, a carboxyl group, or a sulfonimide group.

20. The fuel cell according to claim 1, wherein the material for the base member comprises one of polyether ketone, polyether ether ketone, polyether sulfone, polyether ether sulfone, polysulfone, polysulfide, polyphenylene, polyphenylene oxide, polystyrene, polyimide, polybenzoimidazole, and polyamide.

21. The fuel cell according to claim 1, wherein the first and second electrodes and a connecting member are formed continuously and integrally by a porous metal sheet.

* * * * *